US009682826B2

(12) United States Patent
Pierson et al.

(10) Patent No.: US 9,682,826 B2
(45) Date of Patent: Jun. 20, 2017

(54) ITEM INFEED APPARATUS AND METHOD FOR A PALLETIZER SYSTEM

(71) Applicant: Top Tier, Inc., Clackamas, OR (US)

(72) Inventors: Cary Michael Pierson, Milwaukie, OR (US); Stephen L. Heston, West Linn, OR (US)

(73) Assignee: Top Tier, LLC, Clackamas, OR (US)

( * ) Notice: Subject to any disclaimer, the term of this patent is extended or adjusted under 35 U.S.C. 154(b) by 495 days.

(21) Appl. No.: 13/924,575

(22) Filed: Jun. 23, 2013

(65) Prior Publication Data

US 2014/0374216 A1 Dec. 25, 2014

(51) Int. Cl.
*B65G 47/19* (2006.01)
*B65G 47/244* (2006.01)

(52) U.S. Cl.
CPC ................................. *B65G 47/2445* (2013.01)

(58) Field of Classification Search
CPC ...................................................... B65G 47/19
USPC ................................... 193/32, 31, 30, 28, 15
See application file for complete search history.

(56) References Cited

U.S. PATENT DOCUMENTS

| 4,197,935 A * | 4/1980 | Aterianus ............... B65B 35/24 |
| | | 198/460.1 |
| 4,778,323 A * | 10/1988 | Salts .................... B65G 57/035 |
| | | 100/264 |
| 5,505,291 A * | 4/1996 | Huang ................... B65G 43/08 |
| | | 198/460.3 |
| 7,481,033 B2 * | 1/2009 | Ouellette et al. ............... 53/553 |
| 2004/0129150 A1 * | 7/2004 | Lancaster, III ........ B65G 61/00 |
| | | 99/486 |

* cited by examiner

Primary Examiner — Leslie A Nicholson, III
Assistant Examiner — Lester Rushin
(74) Attorney, Agent, or Firm — Hancock Hughey LLP

(57) ABSTRACT

An infeed apparatus includes an item manipulator that orients items such as cases in a desired orientation as determined by a build menu, and a row build apparatus that is synchronized with the manipulator to space items pursuant to the build menu. The manipulator uses a pusher to push items across a friction belt to thereby orient the items, and includes sensors for determining when an item is in an incorrect orientation. The row build receives items from the pusher and is selectively advanced to locate items in a desired relative orientation so that rows of items are built correctly.

23 Claims, 23 Drawing Sheets

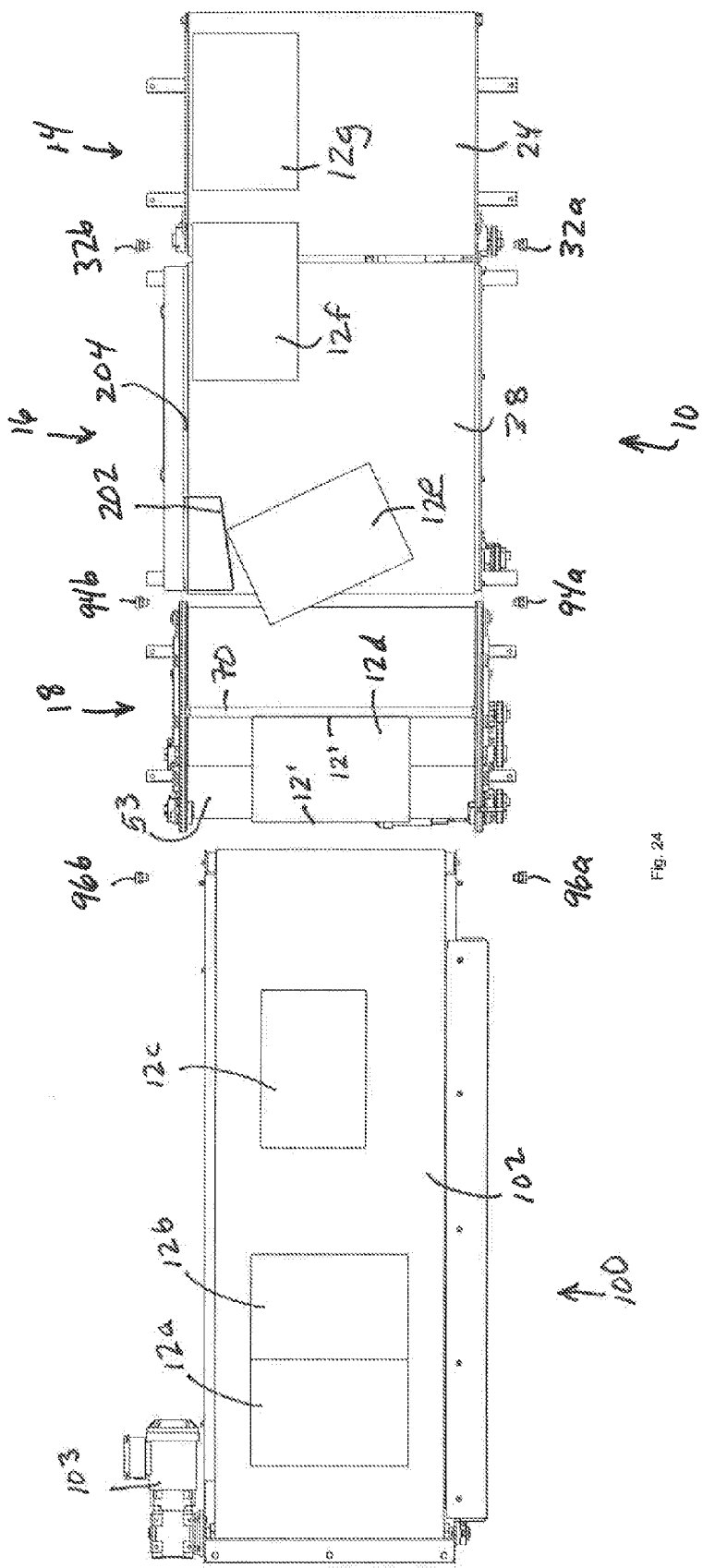

ITEM INFEED APPARATUS AND METHOD FOR A PALLETIZER SYSTEM

TECHNICAL FIELD

The present invention relates to palletizing systems and more specifically to a case infeed apparatus and method that is used to insure that cases delivered to a palletizer are delivered in the correct orientation and with the proper spacing.

BACKGROUND

A palletizer is an apparatus that receives and manipulates items, such as boxes, and places the manipulated articles on pallets in pre-determined positions and orientations in organized rows, layers and stacks to form a stable stack of boxes arranged on a pallet for shipping. There are innumerable devices for palletizing articles, but described in a very general sense all palletizers receive a sequence of items and manipulate those items to produce a palletized stack of them. Typically, a completed stack of cartons is shrink wrapped as part of the palletizing operation in order to finalize the stack for shipping.

Stated in very general terms, a typical palletizer receives a series of items, organizes the items into rows, organizes the rows into layers, and generates a stack of layers on a pallet.

Efficient shipping of palletized items calls for efficient stacking of items on the pallet to minimize open space within the stack and to help insure the stability of the stack to prevent relative movement between items, and ultimately, to insure that the items in the stack arrive at their destination undamaged. Of course, boxes come in a variety of sizes and many boxes are rectangular with opposed parallel side panels and therefore have different width and length dimensions. A standard pallet is used widely throughout the shipping industry. By varying the orientation and/or pattern of boxes from layer to layer, a stable stack of items may be constructed upon a standard-sized pallet. Accordingly, a variety of "box patterns" have been established for stacking specific box sizes on standard pallets. By using an established box pattern for given rectangular boxes that are to be stacked on a standard pallet, the result is an efficient and stable stack of the boxes on the pallet that will perform well during shipping and handling.

A common palletizing system comprises several components that work together to perform the palletizing operation. Boxes are initially placed on an infeed system that delivers the boxes to a row build system. Often the infeed system includes box turning equipment that orients individual boxes in the correct orientation relative to adjacent boxes for the specific box pattern that is being used. Rows are assembled on the row build system—each row is a set of plural boxes arranged according to the box pattern. A row is transferred by one of a variety of methods from the row build system to a layer building station where plural rows are arranged into a layer. A stack is formed by depositing a first layer onto a pallet or slip sheet and subsequent layers are deposited atop the next adjacent lower layer. Layers are added until the stack is complete. Typically, the palletizing operations at the various stations run simultaneously to the extent possible to increase throughput efficiency. As would be expected, there are many variations of the equipment used to palletize, and the general themes of operation.

Regardless of the equipment that is being used, palletizing requires efficiency in design and operation of the device. Among other design and operational criteria, efficiency is often one of the most important considerations. In many applications, time is most critical and a palletizer that more quickly organizes an incoming series of items into a palletized stack of items represents an advantage by increasing throughput and thus greater production levels and economic efficiency.

It will be appreciated that mishandling of boxes in the palletizing process should be minimized as part of an efficient operation and that a palletizing system must be designed to avoid delivery of boxes to the palletizer in an incorrect orientation. For example, a box that is delivered to a palletizer in the incorrect orientation for the specific box pattern that is being used will cause formation of a defective layer. This results in shut down, or at least significant slowdown of the entire palletizing sequence and operator intervention is often required in order to correct the orientation of the mis-oriented box. Unfortunately, delivery of such "out of bounds" boxes—that is, boxes that are either in the incorrect orientation or which are otherwise improperly placed—to palletizing systems continues to be a significant problem and is the cause of much slowdown in palletizing operations. Moreover, any time operator intervention is required to correct out of bounds situations presents a safety concern for workers.

There is a need therefore for a palletizing system that insures delivery of boxes to the equipment in the correct orientation and spacing for whatever box pattern is being used.

The present invention comprises systems that address the shortcomings of prior systems.

BRIEF DESCRIPTION OF THE DRAWINGS

The invention will be better understood and its numerous objects and advantages will be apparent by reference to the following detailed description of the invention when taken in conjunction with the following drawings in which an infeed system and an associated, downstream row build conveyer are illustrated, but in which other components of the overall palletizing system are omitted in order to best show the invention.

In FIGS. 6 through 24 the infeed system and the row build conveyer are illustrated in a variety of situations in order to detail operation of the infeed system and row build conveyer.

FIG. 1 is an upper perspective view showing the infeed system according to the invention in isolation without the other components of the palletizing system, including the side frame elements shown in place.

FIG. 2 is an upper perspective view of a portion of infeed system according to the invention that is similar to the view of FIG. 1, except the side support frames have been removed on the near side of the drawing to illustrate the drive systems.

FIG. 3 is an upper perspective view of a portion of the infeed system according to the invention that is similar to the view of FIG. 2, except the upstream components of the infeed system are removed.

FIG. 4 is a top plan view of a selected portion of the infeed system.

FIG. 5 is a side elevation view of one side of the pusher bar system with the side framing components removed to illustrate the drive motors and drive systems.

FIG. 6 is a side elevation view of one side of the pusher bar system with the side framing components removed similar to FIG. 5, and illustrating the electro-optical sensors and including boxes on the conveyor belt.

FIG. 7 is a side elevation view of one side of the pusher bar system shown in isolation.

FIG. 8 is a side elevation view of the opposite side of the pusher bar system shown in FIG. 7, including the sensors.

FIG. 9 is an end elevation view of the pusher bar system taken along the line 9-9 of FIG. 8.

FIG. 10 is an end elevation view of the pusher bar system taken along the line 10-10 of FIG. 8, looking the opposite way of the view of FIG. 9.

FIG. 11 is an upper perspective view of the infeed system and row build conveyor according to the present invention showing two cases on the infeed system.

FIG. 12 is a top plan view of the infeed system and row build conveyor as shown in FIG. 11.

FIG. 13 is an upper perspective view of the infeed system and row build conveyor according to the present invention showing three cases on the infeed system.

FIG. 14 is a top plan view of the infeed system and row build conveyor as shown in FIG. 13.

FIG. 15 is an upper perspective view of the infeed system and row build conveyor according to the present invention showing two cases on the infeed system and one case transitioning from the infeed system to the row build conveyer.

FIG. 16 is a top plan view of the embodiment illustrated in FIG. 15.

FIG. 17 is an upper perspective view of the infeed system and row build conveyor according to the present invention showing three cases on the infeed system and one case fully transitioned onto the row build conveyor.

FIG. 18 is a top plan view of the embodiment illustrated in FIG. 17.

FIG. 19 is yet another upper perspective view of multiple cases on both the infeed system and the row build conveyor.

FIG. 20 is a top plan view of the embodiment shown in FIG. 19.

FIG. 21 is an upper perspective view of the infeed system and row build conveyor according to the present invention with five cases in various positions.

FIG. 22 is a top plan view of the embodiment of FIG. 21.

FIG. 23 is another upper perspective view of the infeed system and row build conveyor according to the present invention.

FIG. 24 is the top plan view of the embodiment of FIG. 23.

DETAILED DESCRIPTION OF ILLUSTRATED EMBODIMENTS

Figure 1:
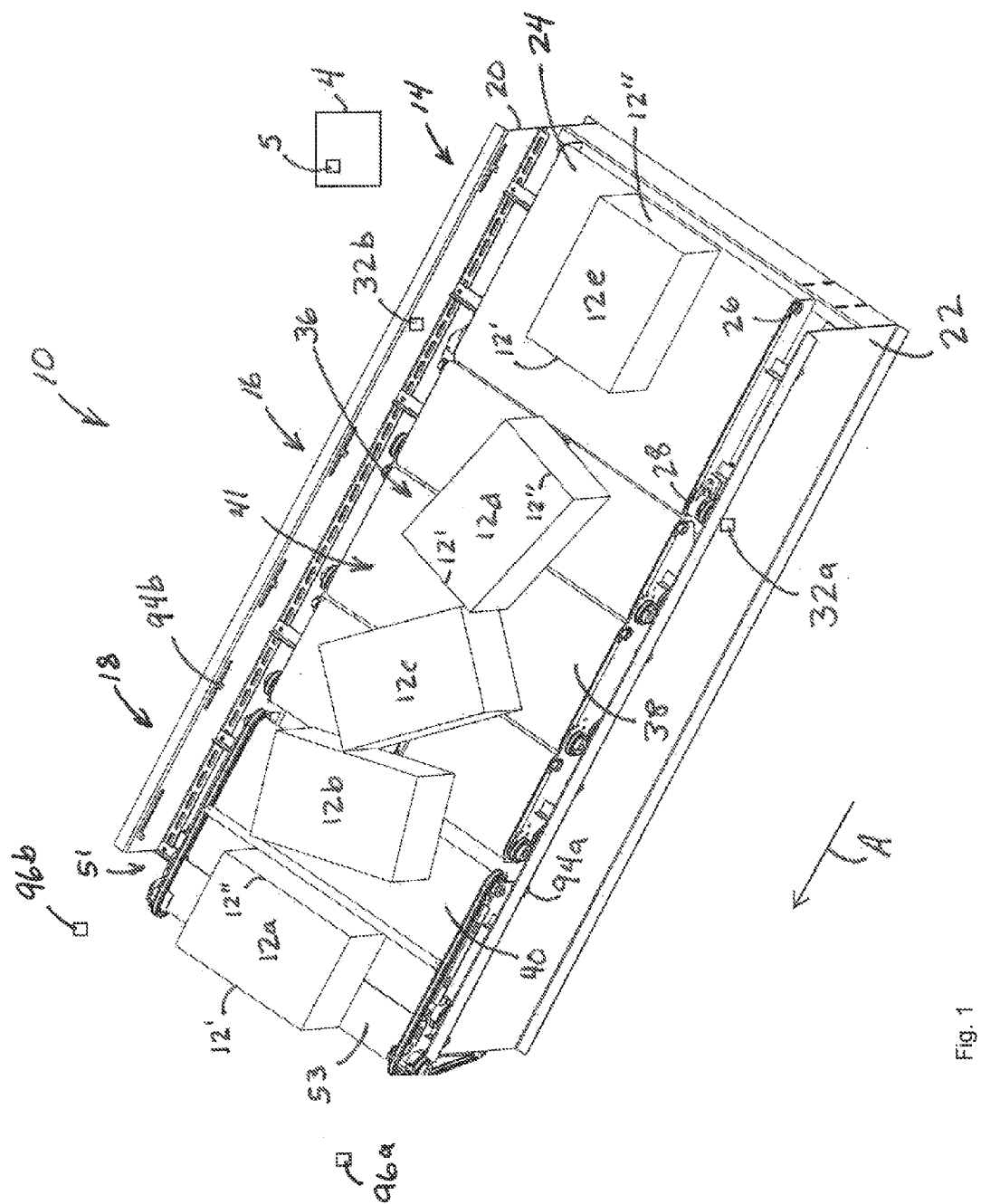
FIGS. 1 through 5 illustrate the infeed system in isolation in order to illustrate the various components of the system.

The invention will now be described in detail with reference to the drawings. Relative directional terms are used at times to describe components of the invention and relative positions of the parts. As a naming convention, the ground plane is considered to be the generally horizontal surface on which the apparatus of the present invention is mounted. In all conventional installations, the apparatus is installed on a horizontal floor and the upper surface of the various conveyers, row build layers, layer heads, etc. described herein are also horizontal and thus parallel to the ground plane. Other relative directional terms correspond to this convention: "upper" refers to the direction above and away from the ground plane; "lower" is generally in the opposite direction, "inward" is the direction from the exterior toward the interior of the apparatus, "vertical" is the direction normal to the horizontal ground plane, and so on. "Upstream" refers to the direction that is the opposite of the flow of boxes on the system, and "downstream" is the opposite direction—the direction of the flow of boxes. The articles that are being manipulated on the palletizer described in this specification are standard boxes; in the industry, boxes are also interchangeably referred to as cases and cartons.

Furthermore, in most of the figures used herein some structures are omitted in order to better illustrate selected components and structures. This includes framing and support structure and the like used in palletizing systems. Such environmental components are well known to those of skill in the art and need not be described or shown in the figures to understand the invention.

It is to be understood that the infeed system 10 and the row build conveyor 100 described herein are used as components of an entire palletizing apparatus that includes numerous additional systems, including for example a lift deck, a layer head a receiving deck and a stretch wrapping station. These components are not illustrated because the invention described herein may be used with conventional versions of the components. Moreover, versions of these components are described in detail in, for example, U.S. Pat. Nos. 7,736,120; 8,074,431; and 8,257,011, each of which is owned by the assignee of the present invention and the disclosures of which are incorporated herein by this reference.

The components and operation of the infeed system are described in greater detail below. However, with reference to FIG. 1 and briefly described, the infeed system 10 is designed for receiving product that is to be palletized, for example, output from a production or manufacturing operation or from a repackaging operation. These so-called production feed areas are located "upstream" of the infeed system in terms of product flow. Infeed system 10 includes three general sections: a metered belt, a case turner, and a pusher bar. Each of these sections is under the continuous control of a computerized processor, shown generally at 4, and each section includes item transport conveyors, a variety of motors, sensors and encoders that provide feedback and control information to the processor. Processor 4 is a conventional microprocessor with associated software and systems for complete operation of the palletizer. Among other things, processor 4 stores plural build menus 5—also referred to herein as "pattern build menus." As detailed below, each build menu 5 contemplates factors including box size, the configuration of boxes in rows, the configuration of rows in layers, and stack height. The build menu thus ultimately defines the number and orientation of boxes in a row, the number and orientation of rows in a layer, and the arrangement and number of layers in a stack.

The function of the infeed system 10 is to receive cases 12 from the upstream production feed area, manipulate the cases according to the build menu that is being used, and control operation of the palletizing system according to data from the sensors; when an out of bounds situation is detected, operation of the palletizing system is shut down or otherwise modified to allow the out of bounds condition to be corrected. As another naming convention used herein, all cases shown in the drawings are identified with the reference number 12. When there is more than one case 12 shown in a drawing figure, the case that is furthest downstream is assigned reference number 12a, the next adjacent upstream case is 12b, then the next upstream case is 12c, and so on.

Continuing with the general description of infeed system 10, cases 12 are received from the production area and delivered to the infeed system 10 where individual cases 12 are indexed there along for presentation to the remaining portions of the palletizer. As may be appreciated and as is detailed below, infeed system 10 operates to appropriately orient a sequence of cases 12 according to a build menu 5 that is programmed into processor 4. The build menu 5 includes data relating to box size, row patterns and individual box orientations in each row, sequential row patterns that interfit to form layer patterns, and layer patterns that interrelate to ultimately produce a stable stack of boxes on a pallet. As shown in the figures and as readily recognized, cases 12 are not necessarily symmetrical in their length and width dimensions. For example, with standard rectangular boxes the length and width dimensions are not the equal. As such, individual boxes 12 in any given row and any row in a layer may need to be oriented according to the specific predefined build menu that takes into account row-by-row variations within a layer, and layer-to-layer variations for adjacent layers on a stack of boxes 12 deposited on a pallet.

Continuing with the general description of product flow through a palletizer, a predetermined number of cases 12 are conveyed in the desired and predetermined orientation from the infeed system 10 onto the row build conveyer 100 where the items are accumulated in individual rows. It will be understood that the number of cases in a row and their orientations relative to one another will vary depending upon the sizes of the items, their dimensions, etc.—that is, the build menu 5 dictates the number and relative orientation of cases in a row. With brief reference to FIG. 11, the row build conveyer 100 comprises a conveyer bed 102 that is under control of an encoder feedback motor 103 that is in turn under control of the processor 4. The conveyer bed 102 may be of any appropriate type of conveyer bed, including for example a driven table top type of chain or plural driven rolls.

Operationally, when a single row of cases 12 has been assembled onto the row build conveyer 100, the cases 12 are transferred together as a row from the row build conveyer 100 onto an upstream row processing device such as a lift deck or layer accumulation area (not shown) with, for example, a puller bar or other equivalent apparatus such as a pusher bar. The row of cases 12 may be further conditioned as appropriate on with compaction bars and the like if appropriate once transferred onto the upstream row processing device such as a lift deck or layer accumulation area (not shown)

From this point the palletizer uses known components to sequentially build a stack of cases 12 on a pallet according to known techniques. Those components and methods are not elements of the present invention, are known to those of skill in the art, and are thus not detailed here.

With the foregoing as background information, the infeed system 10 used in the present invention, and its components, will now be described in detail.

With returning reference to FIG. 11, infeed system 10 generally defines a conveyer system that delivers cases 12 from the production feed where boxes are generated to the row build conveyer 100. The infeed system 10 incorporates apparatus and functionality that allows the cases 12 to be positioned in the correct orientation and with the correct spacing for the build menu 5 that is being used. Moreover, the infeed system incorporates feedback systems that detect when a particular case 12 is incorrectly positioned—that is, an "out of bounds" condition—and responds to such a condition appropriately so that the condition may be corrected either automatically or by operator intervention before a defective row or layer is built. In some out of bounds situations it is most efficient to stop the system operation and have the operator correct the problem. In other instances it may be possible to correct the problem with a slowing of the system speed, coupled with some kind of corrective intervention. In either case, it is much safer and quicker to correct a mis-positioned case 12 before a defective layer is actually built.

Turning now to the series of drawings of FIGS. 1 through 10, infeed system 10 comprises three separate components, referred to herein as a metering belt section 14, a case turner section 16 and a pusher bar section 18. Each of these components is independently operable and controlled by processer 4. Metering belt section 14 is located at the most upstream portion of infeed system 10, case turner section 16 is located immediately downstream of and adjacent to metering belt section 14 and pusher bar section 18 is immediately downstream of and adjacent to case turner section 16. Each of these three sections that make up the infeed system 10 is described below beginning with metering belt 14.

As noted, metering belt 14 is located at the most upstream portion of infeed system 10 and is designed to receive cases 12 from the production feed that is located prior to and upstream of the infeed system 10 in terms of product flow. The normal product flow direction of infeed system 10 is illustrated with arrow A in FIG. 1, and the arrow thus illustrates the "upstream" and "downstream" ends of the infeed system—downstream is the direction the arrow points and upstream is the opposite direction. In FIG. 1 there are five separate cases 12 illustrated on the infeed system 10. As noted above, for purposes of clarity these cases are identified with reference numbers 12a, 12b, 12c and so on to identify specific cases.

Infeed system 10 and its three components, metering belt section 14, case turner section 16 and pusher bar section 18 are mounted to and supported by elongate side frames 20 and 22. The side frames 20 and 22 are conventional support members and preferably include footings that rest on the floor and which allow for vertical adjustment, and brackets and bracing as appropriate and as understood by those of skill in the art.

Metering belt section 14 is defined by a high friction belt 24 that extends around upstream and downstream rollers 26 and 28, respectively. At least one of the rollers 26 or 28 is a driven roller that is connected by a drive belt to an AC motor (neither of which is shown), which is under the control of a variable frequency drive controller. There are numerous types of high friction belts that may be used for belt 24. One preferred type of belt is a high friction table top chain meter belt, although as noted, there are many types of belts that will suffice. The metering belt section 14 is capable of receiving cases 12 from the production feed that is immediately upstream of the metering belt section. Since the motor that drives belt 24 is under the control of a variable frequency drive controller and processor 4, the speed of the belt may be varied so that the metering belt section 14 is capable of holding back some accumulated cases 12 that are delivered from the sortation area.

Infeed system 10 utilizes several pairs of electro-optical sensors mounted along the length of the infeed system to monitor the position and orientation of cases, and in cooperation with the processor control operation of the components of the system. Each of the sensors is electrically interfaced with the processor 4 and each is a standard position sensor that is capable of detecting changes in light—i.e., interruption of the light beam that is transmitted between the paired sensors across the conveyer—and convert that change to an electronic signal that is transmitted to processor 4. Processor 4 includes an encoder algorithm that correlates the electronic signals received from the sensors to data correlating to the build menu 5 and other information relating to operation of the system. The sensors are mounted adjacent the infeed system 10 in positions that the light beam between paired sensors is interrupted by boxes 12 as the boxes are conveyed past the sensors.

As illustrated, the sensors may be mounted to side frames 20 and 22. In this description, sensors in a pair are identified with a reference number combined with either the letter "a" for the sensor mounted to side frame 22 and the letter "b" for the other sensor of the pair that is mounted on the opposite side frame 20. For example, one pair of sensors is identified with reference numbers 32a, 32b and this convention is followed throughout this specification. Those of skill in the art will recognize that the described paired thru beam sensors are only one style of sensor that can be used with the present invention, and that other types of sensors will work just as well. These include, for example, retro reflective, diffuse beam and other sensor types, which are equally capable of providing input to processor 4.

A first pair of electro-optical sensors 32a and 32b is mounted near the downstream end of metering belt section 14 on opposite sides of the belt 24—mounted to side frames 22 and 20, respectively. Both are electronically connected to processor 4. The sensor 32a is preferably mounted to frame 22 but may be mounted to any appropriate structure; sensor 32b is mounted directly opposite sensor 32a on frame 20. The sensors are aligned so that a beam of light is transmitted between the two sensors—this applies to each pair of sensors utilized in infeed system 10 described herein. Sensors 32a and 32b define the metering belt section 14 controllers that operate in connection with processor 4 to stop and start the belt 24; the speed of the belt 24 is regulated by processor 4 so that only a single case 12 is indexed onto the case turner section 16 at a time.

Case turner section 16 is configured to receive cases 12 delivered from metering belt 14 and to rotate selected cases 12 according to the specific build menu 5 that is stored in processor 4. In FIG. 1 the case turner section 16 is shown generically because there are numerous types of case turners that may be used with the present invention. For example, the case turner shown generally at 36 in FIG. 1 could be a caterpillar type of case turner that utilizes one or more differential speed belts that have opposing sides that are capable of being moved at different speeds to cause a case on the belts to rotate. This type of a case turner is known in the art and is described generally herein. The case turner 36 utilizes a belt 38 of that has opposite sides that are capable of being driven at different speeds. The belt 38 shown in the figures is configured as three paired, side-by-side belts (for a total of 6 belts in the case turner section 16). The belt 38 and its side-by-side sections are driven by motors (not shown) that are variable speed motors under the control of the processor 4.

Other types of suitable case turners include deployed arm turners, lift and rotate plate turners and others as known to those of skill in the art. The series of FIGS. 11 through 24 illustrate a "bump turn" obstruction type of turner.

With reference to FIG. 1 it may be seen that the five cases 12 are arranged in different orientations along the length of infeed system 10. Thus, case 12e—the most upstream of the cases—is rotated 90 degrees relative to the case 12a, the most downstream of the cases. The box menu 5 thus may instruct the case turner 16 to have the case 12a rotated by 90 degrees relative to case 12e, etc. The build menu 5 stored in processor 4 provides a signal to the case turning components of case turner section 16 instructing actuation of the case turning apparatus when a specific case requires turning according to the pattern build menu 5.

The function of case turner section 16 is to rotate selected cases according to the pattern build menu 5 stored in processor 4.

Operationally, when a single case 12 such as case 12b in FIG. 1 is indexed onto case turner section 16 from the metering belt 24 the processor 4 recognizes whether that particular case needs to be turned based on the known orientation of the case as it is indexed onto the case turner section, and based on the pattern build menu 5. The processor 4 adjusts the speed of metering belt so that the speed of belt 38 of case turner section 16 is always moving faster than belt 24 of metering belt section 14 so that that the case 12 is always transitioned onto the case turner section with a gap between adjacent cases. Once a case has been transferred from the metering belt 24 onto the case turning section 16 the metering belt 24 either stops when the next case is positioned on the metering belt, or continues to run depending on the spacing required in the build menu 5.

In FIG. 1, case 12d has been handed off from the metering belt section to the case turner section 16 and processor 4 has initiated rotation of case 12d relative to case 12e. The case 12d is positioned on belt 38 at the location on the belt where case turning is done, shown generally at 41. When this occurs, the motors that drive the belt 38 and which are operably connected to and under the control of processor 4 initiates operation of the case turner 41 to turn case 12d by 90 degrees.

As noted above, the metered belt section 14 indexes cases onto the case turner section 16. In practice, the metering belt 24 delivers the cases to the case turner section 16 such that there is a gap between adjacent cases; the amount of the gap varies depending on if a specific case needs to be turned or not according to the particular build menu. Cases 12 are moved downstream on infeed system 10 and are next transferred from the case turner section 16 to the pusher bar section 18.

Figure 2:
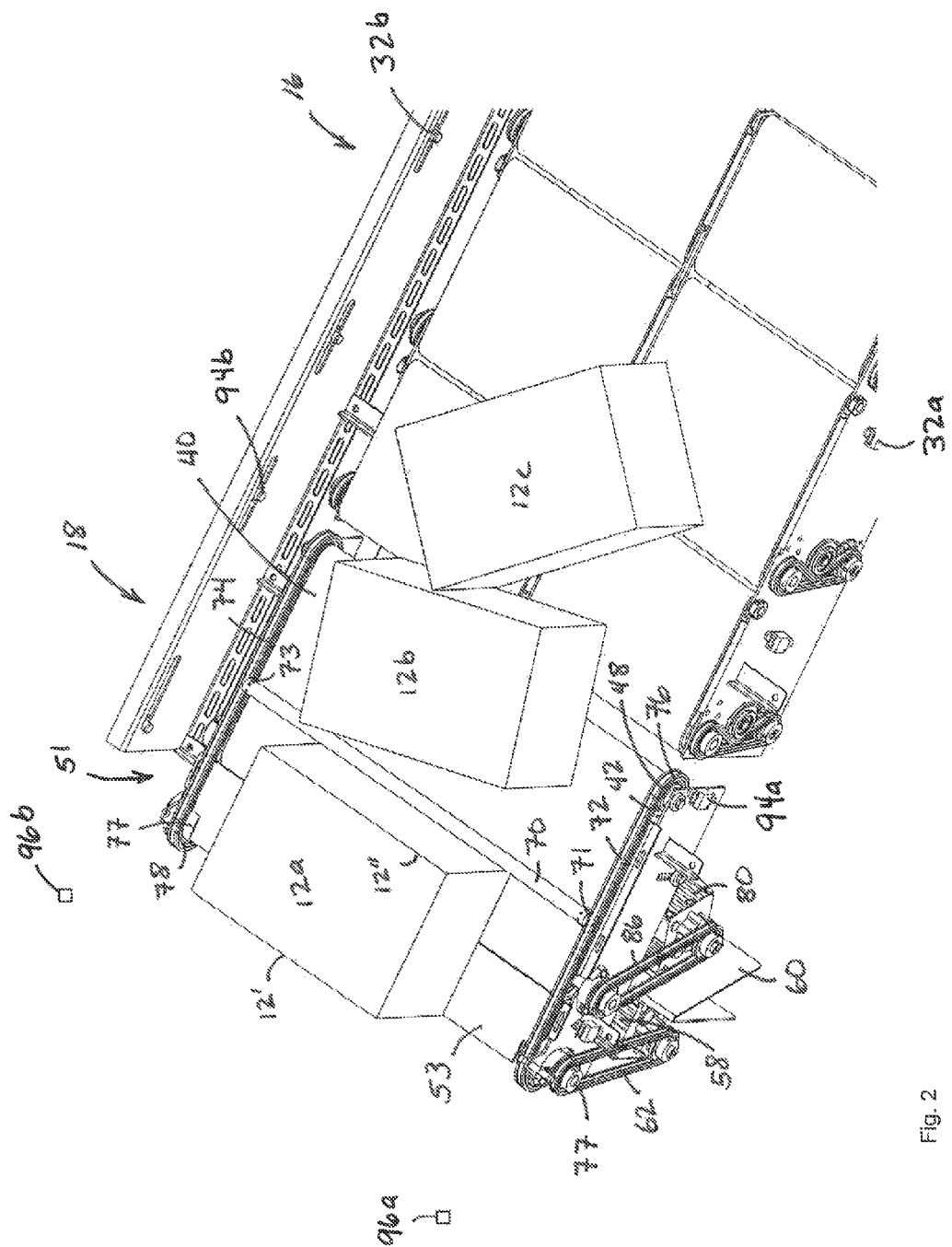
Figure 3:
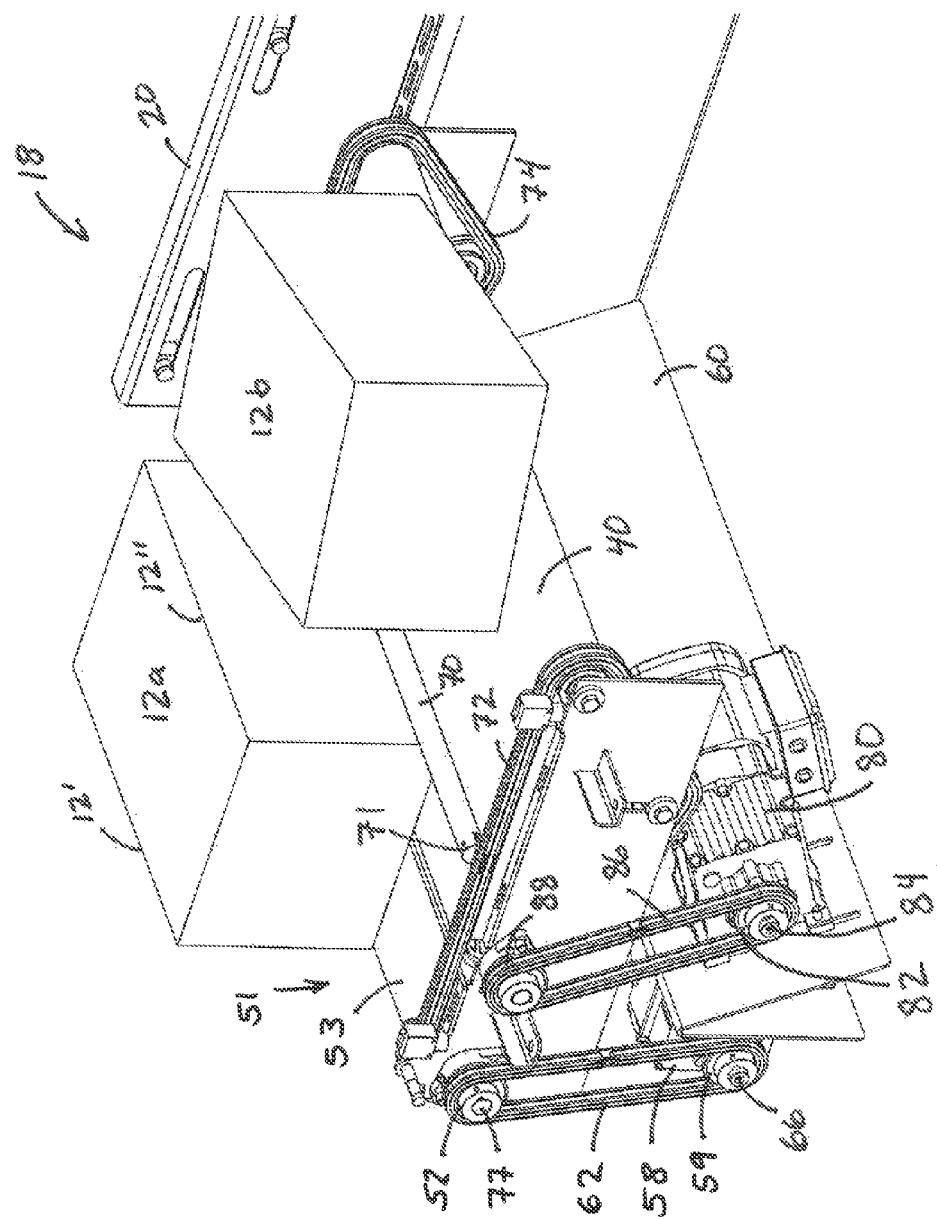
Figure 4:
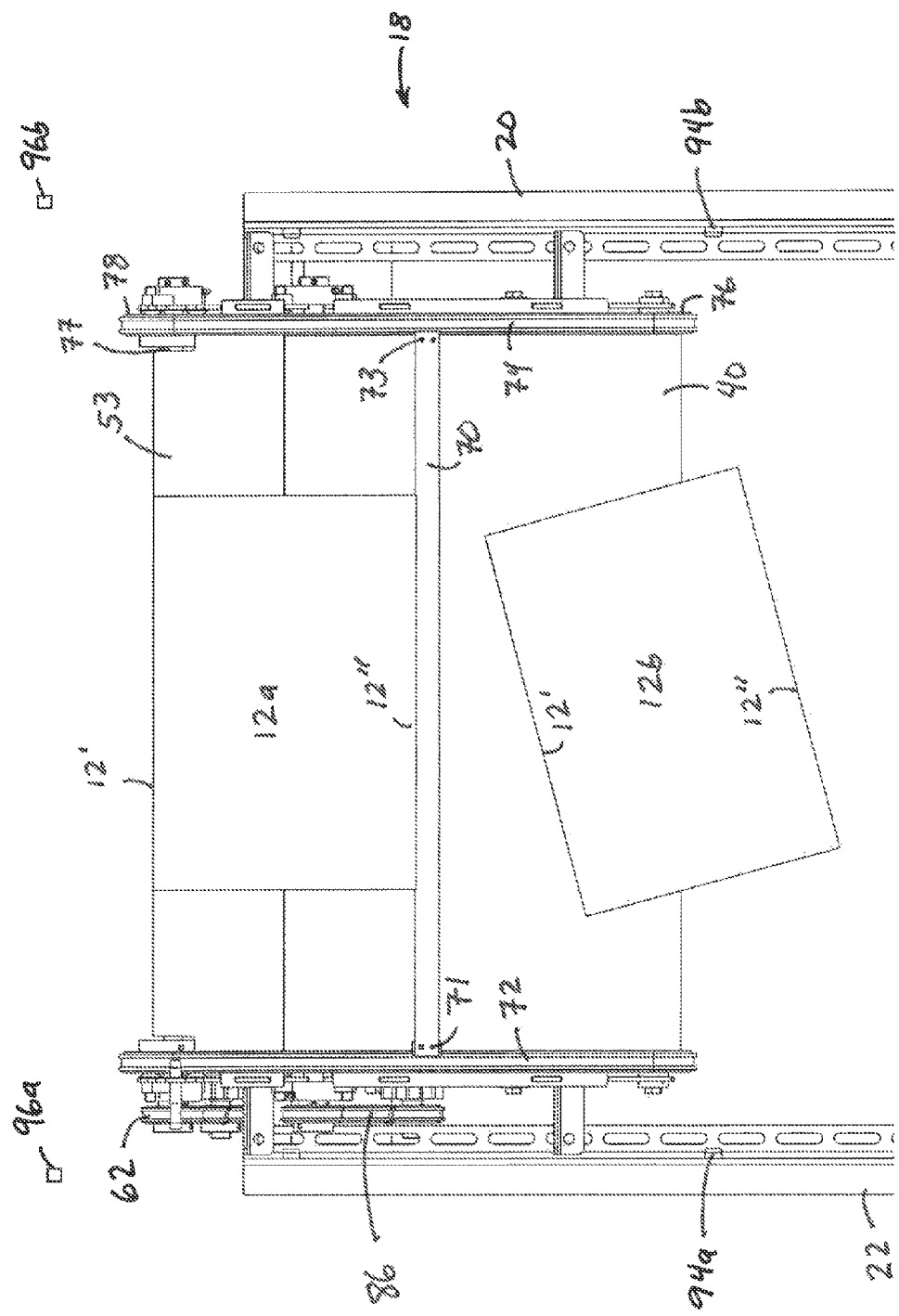
Figure 5:
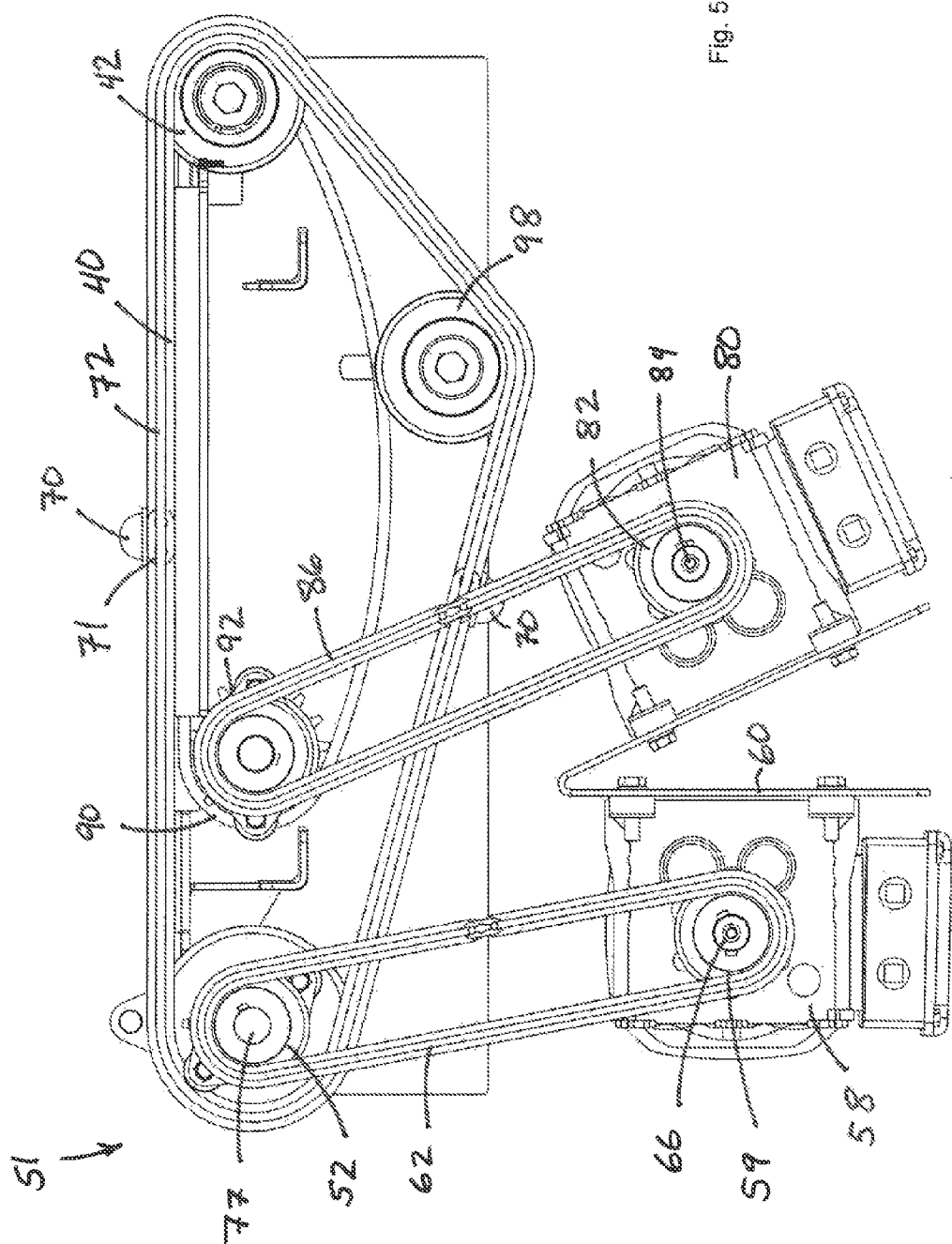

Although the case turner section 16 and case turner 36 generally orientates cases 12 reliably, there are instances where the cases are rotated less or more than 90 degrees as needed for the pattern build menu 5. The case turner section 16 does not position cases; its only function is transport cases and turn designated cases when the build menu 5 requires turning. For instance, as shown in FIGS. 1 and 2, a case 12b that is leaving case turner section 16 has been rotated less than 90 degrees and is thus skewed in its position as it moves down the infeed system 10 and as it is fed onto the pusher bar section 18, which is immediately adjacent to and downstream of case turner section 16. As detailed below, pusher bar section 18 functions to correct case positioning as the cases are fed from the pusher bar section onto the next adjacent section, downstream row build conveyer 100. Moreover, pusher bar section 18 operating in concert and cooperation with row build conveyer 100 insures that cases 12 are precisely positioned relative to adjacent cases according to the specifications of the pattern build menu 5 on the row build conveyer.

Reference is now made to the series of drawings of FIGS. 2 through 10, which best illustrate the various components of pusher bar section 18 of infeed system 10. An endless friction belt 40 extends around an upstream roller 42 that has its opposite ends 44 and 46 journalled to bearings 48 (one of which is shown in FIG. 2). The bearings are suitably attached to the side frame 20, which is removed in the view of FIG. 2 to illustrate the components of the pusher bar section 18. At the downstream end of the pusher bar section, generally identified with reference number 51, endless belt 40 extends around downstream roller 92 that has its opposite ends journalled to bearings that are likewise attached to the side frame 20 or brackets attached thereto. The upper surface of friction belt 40 between the upstream end and downstream end 51 defines a box supporting zone of the pusher bar section 18 on which boxes 12 are supported as they are conveyed along infeed system 10 and on the box supporting zone. The belt 40 defines the conveyer on which items are transported on the pusher bar section.

A variable speed belt drive motor 80 is mounted to a bracket 60 below belt 40. The belt drive motor 80 is under the control of processor 4 for accurate control of the motor speed. The belt drive motor 80 is connected with a drive belt 86 that extends around pulley 82 on the drive motor 58 output shaft 84 and around pulley 88 that is connected to downstream roller 90. Rotation of output shaft 84 of drive motor 80 causes movement of the endless belt 40 of the pusher bar section 18.

Pusher bar section 18 includes one or more pusher bars 70 that extend across endless belt 40 transverse to the belt travel direction and which are independently operated from belt 40. In the embodiment illustrated herein there are two pusher bars 70 located approximately equidistant from each other along the loop of chains that drives the pusher bars. Each pusher bar has one end 71 attached to a drive chain 72 that extends in a loop at one side of the belt 40 and its opposite end 73 attached to a drive chain 74 that extends in a similar loop at the opposite side of the belt. The drive chains 72 and 74 extend around sprockets that are mounted to the ends of the upstream roller 42 and a downstream shaft 77, respectively. More specifically, geared sprockets 76 are mounted to each opposite end 46, 48 of upstream roller 42 and identical geared sprockets 78 are mounted to the opposite ends of downstream shaft 77 such that the sprockets 76 are longitudinally aligned with corresponding sprockets 78. The drive chain 72 extends around sprockets 76 and 78 on one side of endless belt 40 and the drive chain 74 extends around sprockets 76 and 78 on the opposite side of the belt. As noted, in the embodiment illustrated herein, there are 2 pusher bars spaced approximately evenly along the path defined by the chains. A pusher bar motor 58 that is mounted to bracket 60 has a pulley 59 mounted to its output shaft 66. A drive belt 62 extends around pulley 59 and a pulley 52 that is attached via shaft 77 to geared sprocket 78 that is aligned with upstream geared sprocket 76 and meshes with drive chain 72. As with belt motor 80, pusher bar motor 58 is a variable speed motor that is an encoder feedback motor under the control of processor 4 for accurate control of the motor speed. Both the operation and speed of pusher bar motor 58 are under the control of processor 4, and are independent of the operation and speed of belt drive motor 80.

Figure 6:
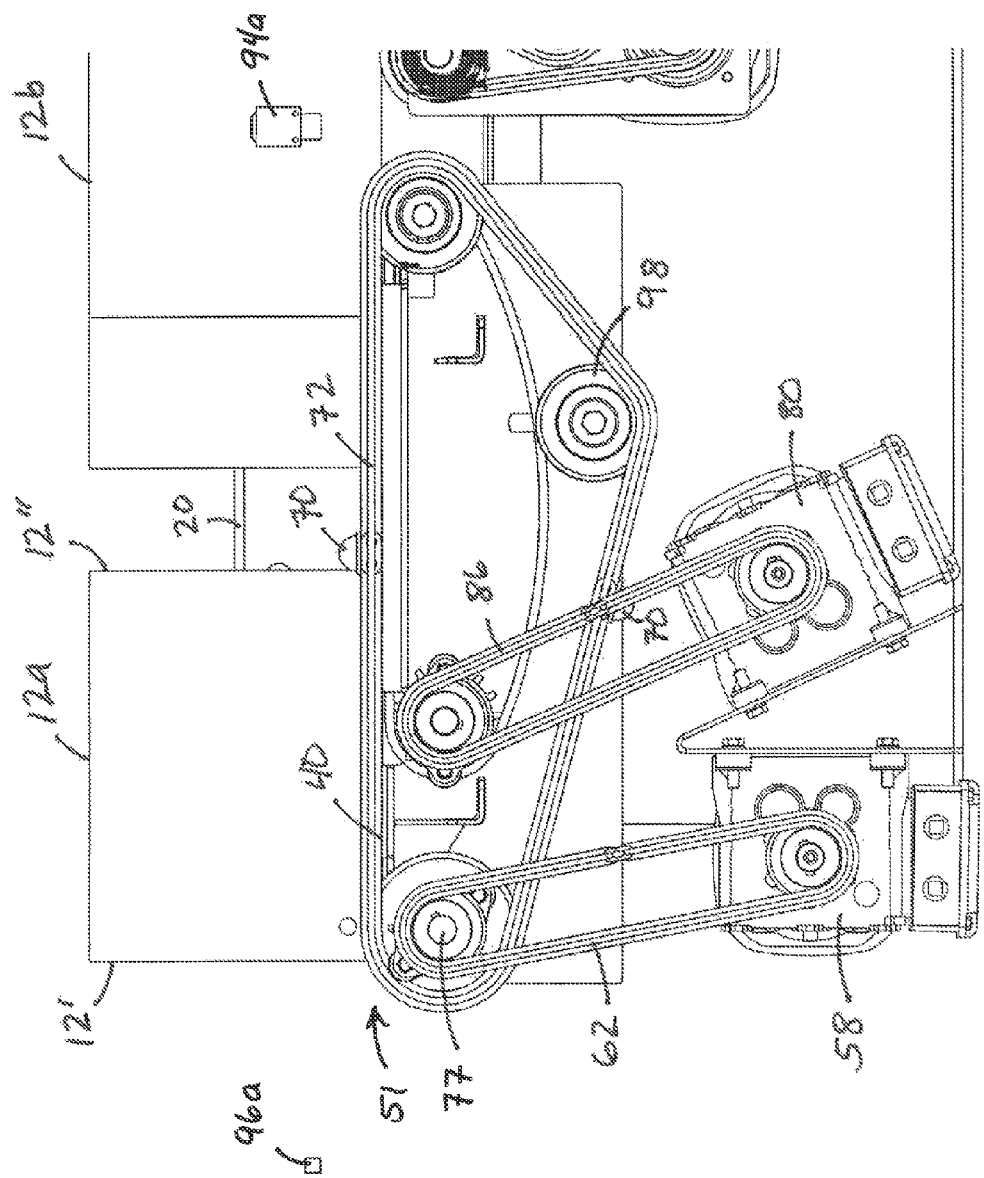
Figure 7:
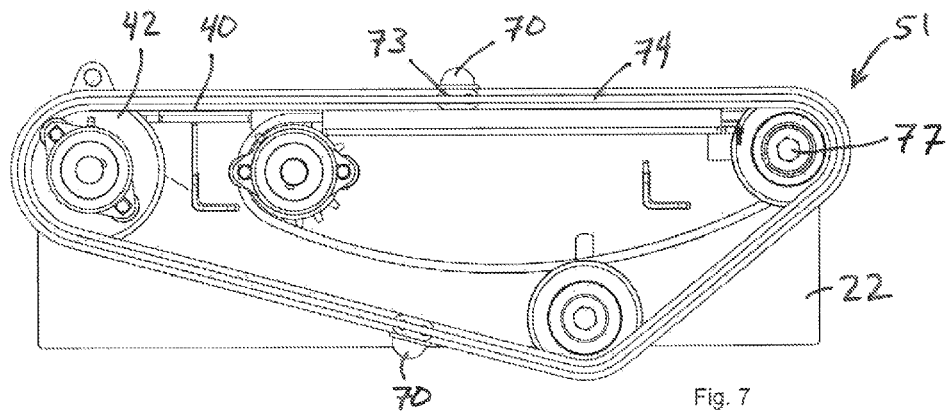
Figure 8:
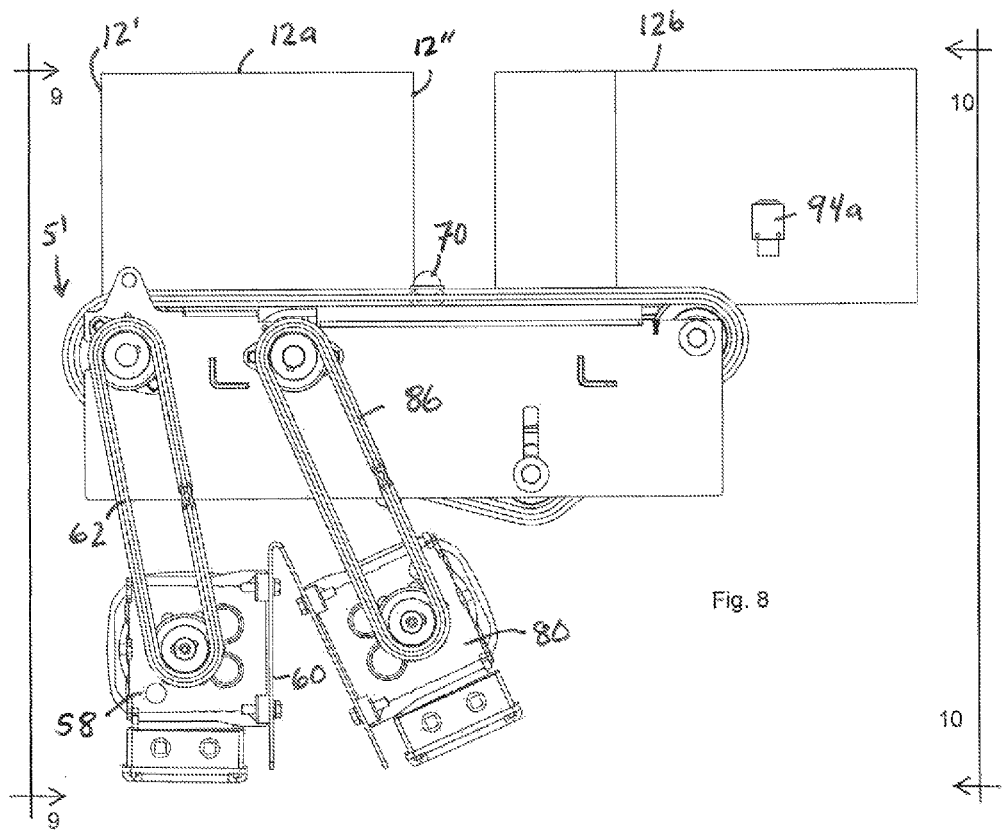
Figure 9:
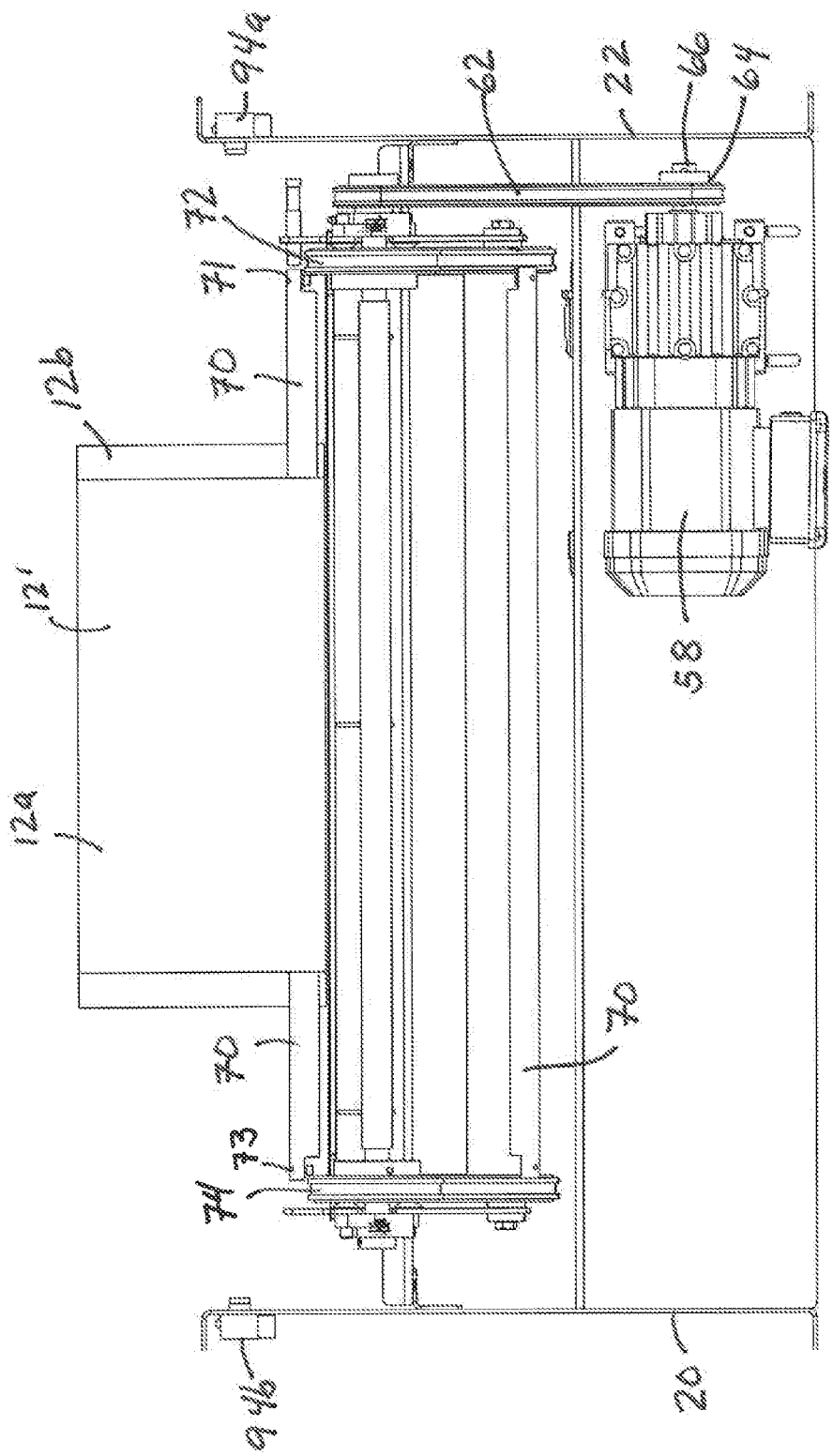
Figure 10:
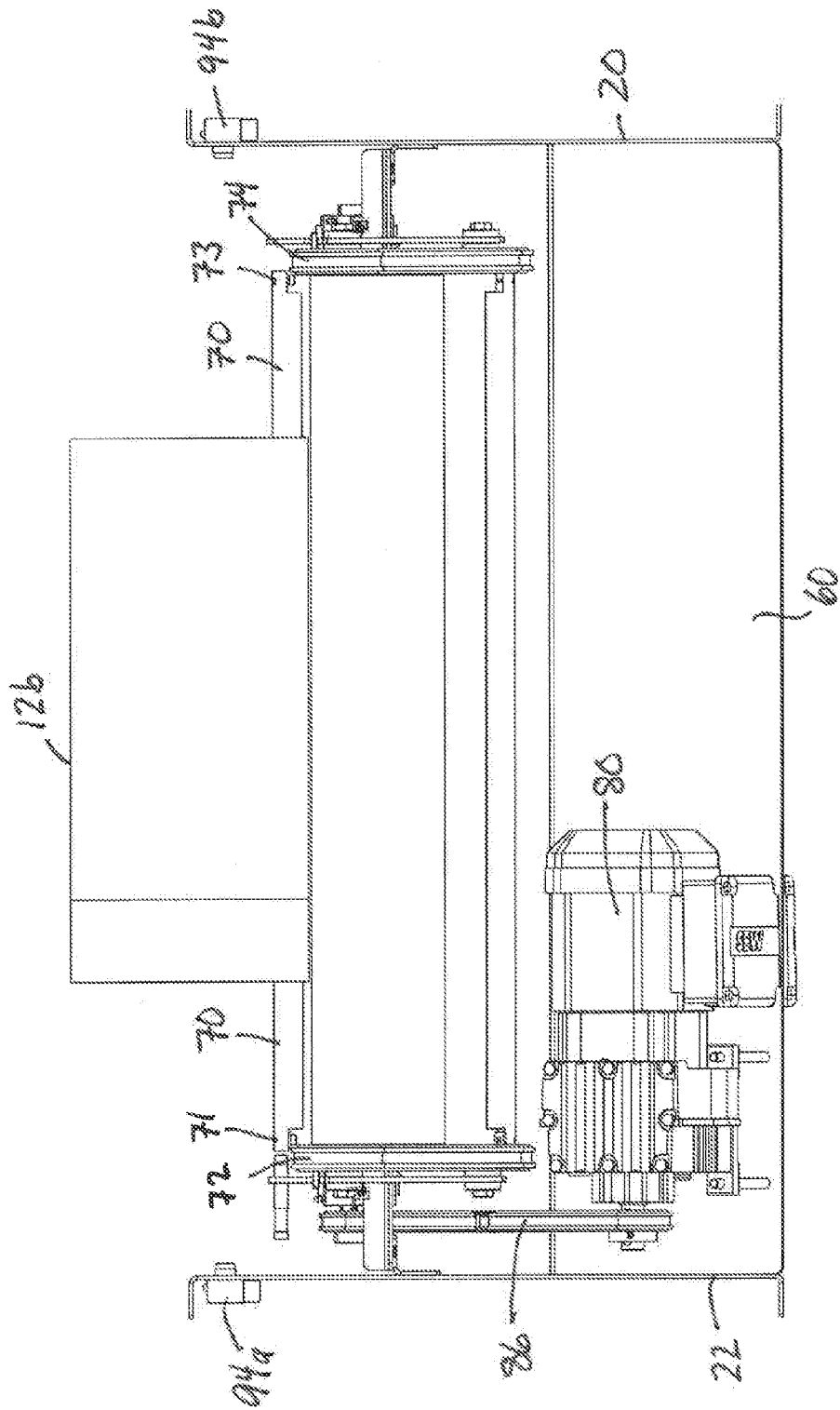

As illustrated in various figures, and especially the side elevation view of FIGS. 6, 7 and 8, as pusher bar motor 58 operates, rotation of output shaft 66 causes movement of drive chain 72 such that pusher bars 70 travel from the upstream end of the pusher bar section 18 toward the downstream end along the upper surface of the belt 40 (i.e., in the counterclockwise direction in FIG. 6). Drive chains 72 and 74 transition around the geared sprockets 78 on the downstream shaft 77 and travel along a return path below belt 40, over a lower sprocket 98 (see FIG. 6) and then transitioning around upstream roller 42 on sprockets 76 in a continuous path around the pusher bar section 18. The pusher bars 70 are closely spaced from the surface of belt 40 as they travel over the top of the belt as best illustrated in, for example, FIG. 5.

An apron or dead plate 53 is located immediately downstream of the roller 90 of belt 40 and is positioned so that cases 12 are smoothly delivered from belt 40 and/or pusher bars 70 onto the dead plate 53. The function of the dead plate is to define a smooth transitional zone for cases 12 transitioning from pusher bar section 18 onto roller conveyer 100, and also to function as a high friction stationary plate across which the cases are pushed by the pusher bars to assist with squaring of the trailing edges of the cases against the pusher bars. Similarly the friction belt 40 can slow or stop during pusher bar engagement with a case to further increase drag against the case bottom to assist case straightening by the pusher bar that completes transition of cases across pusher bar section 18.

Ideally, when a case 12 is being transported from case turner section 16 to pusher bar section 18, drive belt motor 80 adjusts its output speed so that the speed of endless belt 40 matches the speed of belt 38. The case 12 is thus transferred from case turner section 16 to pusher bar section 18 with the conveyer belts associated with each section— belt 38 and endless belt 40, respectively—travelling at the identical speed. This assures a smooth and accurate transition of the case 12 from one section to the next adjacent section. However, the belts 38 and 40 may be traveling at differential speeds. In any event, sensors 94a and 94b detect the presence of a case 12 entering pusher bar section 18 when the leading edge 12' of the case interrupts the light beam transmitted between the sensors. The case 12 continues to move in the downstream direction until it is fully transitioned onto the endless belt 40 of the pusher bar section.

A first pair of upstream electro-optical sensors 94a and 94b is mounted near the upstream end of pusher bar section 18 on opposite sides of belt 40 and a downstream pair of sensors 96a and 96b is mounted adjacent to the downstream end of the pusher bar section, over the row conveyer 100. The sensors 94 and 96 are electrically interfaced with processor 4. Like sensors 32, sensors 94 and 96 are position sensors that detect changes in light—i.e., interruption of the light beam that is transmitted across the endless belt 40—and coverts that change to an electrical signal that is transmitted to processor 4.

Operation of pusher bar section 18 will be described next. As a case 12 moves downstream from case turner section 16 the leading edge 12' of the case passes through sensors 94a and 94b. The belt 40 is at this point being driven by drive motor 80 at speed X. Once the trailing edge 12" of the case passes by sensors 94a and 94b the controller 4 recognizes that a case is located on pusher bar section 18 and the controller initiates operation of pusher bar drive motor 58 to thereby cause movement of the pusher bars 70 in the direction moving from upstream toward downstream. The pusher bars 70 are driven at a speed that is relatively greater than X—that is, the pusher bars 70 are travelling over belt 40 faster than the case 12, which is stationary on the belt and thus traveling at the same speed as the belt. As the pusher bar 70 engages the trailing edge 12" of case 12, which as noted is traveling more slowly than the pusher bar, the case is propelled forward (i.e., downstream) by the pusher bar over the relatively more slowly moving belt 40. The controller may adjust the speed of belt 40 to insure that the belt is travelling more slowly than the pusher bar, and may even temporarily halt rotation of the belt. As the case 12 is propelled downstream by the pusher bar 70 over the relatively more slowly moving (or stationary) belt 40, the case 12 will square against the pusher bar due to friction between the bottom of the case and the belt 40 and also the dead plate 53 if the case has moved that far downstream. That is, the trailing edge 12" of the case aligns parallel to the pusher bar 70 and the relatively more slowly moving, or static, belt increases the friction between the bottom of the case and the belt to enhance squaring of the case relative to the pusher bar. The length of the portion of the belt 40 that the pusher bar 70 transports the case 12 across does not need to be the full length of the pusher bar travel distance because once the pusher bar engages the case, the bar may provide the entire forward (i.e., downstream) transport of the case. As the now squared case 12 continues downstream the case is transported past paired sensors 96a and 96b, which are positioned slightly downstream of end 51 of the pusher bar section 18.

Stated in another way, the pusher bars 70 move in a circular path (i.e., counterclockwise in the view of FIG. 6) and when the bars are moving over the upper surface of belt 40 i.e., the box supporting zone, they are moving in the direction from upstream toward downstream—arrow A in FIG. 1. With a case 12 positioned fully on belt 40—that is, with the case completely supported on the belt so that the leading edge 12' and trailing edge 12" are both within the limits of the case supporting surface consisting of belt 40 and dead plate 53—and with movement of the belt either slowed or stopped, a pusher bar 70 comes up from behind the case—i.e., approaches the case 12 from the upstream direction as the pusher bar travels from upstream toward downstream. The pusher bar is moving along its continuous path at a speed that is greater than the speed of belt 40, if the belt is moving at all. As such, the pusher bar makes contact with the trailing edge 12" of the case. As the pusher bar 70 engages the case from behind, it pushes the case 12 in the downstream direction against the friction between the case and the high friction belt 40, which is traveling slower than pusher bar 70 or which is completely stopped, and or dead plate 52. This causes the rear edge of case 12—that is, the trailing surface 12", to align itself parallel to the pusher bar 70. If case 12 is skewed on belt 40 so that its flat trailing surface 12" is in any orientation other than parallel to the longitudinal axis of pusher bar 70, the case is shifted and aligned with the pusher bar as the case is pushed across the friction belt by the pusher bar.

With the case size information stored in the processor at build menu 5, the dimension of the case 12 passing by the sensors 96a and 96b is known and therefore the orientation of case 12 is known. If a rectangular case is conveyed past a pair of sensors such that the long side of the box is parallel to the direction of conveyer travel (arrow A, FIG. 1), and the relatively shorter side of the box is transverse to the direction of travel, the sensors will detect a box length that actually corresponds to the true box length. In other words, if the box is situated on the belt so that the leading edge 12' first trips the sensor beam and the trailing edge 12" (as determined by the position of the pusher bar 70), the processor 4 recognizes box length data corresponds to a box being in a given orientation. But if the box is skewed on the belt so that the beam of light is first broken by a corner of the box (rather than an end of the box) and thus the diagonally opposed corner being pushed by pusher bar 70, the length value determined by the processor is greater than that of a correctly position box. In the case of a skewed box, the corner that first passes through the light beam is the leading edge. Of course, if a case is symmetrical in its width and length dimensions (i.e., a square case) there is no distinction between the leading and trailing edge dimensions regardless of which side of the box is the leading edge, although the diagonal direction is longer than the length and width dimensions. As such, it will be appreciated that the "leading edge" may be a side of a case, a corner of the case, or some other surface of the case and the leading edge thus is the surface of the case that breaks the light beam.

As noted previously, drive motor 58 is an encoder feedback motor under the control of controller 4. The encoder feedback function allows the controller to recognize the position of pusher bar 70 along its travel path. Said another way, the position of the pusher bar 70 is electronically evaluated throughout its travel path so that when the leading edge 12' of a case passes sensors 96a and 96b, the orientation of the case may be evaluated by processor 4 and compared to the expected value. If the detected case length value (i.e., the distance between the leading surface 12' at sensors 96a and 96b and the trailing surface at pusher bar 70) is equal to the expected case length value (i.e., the predetermined length value for that case in build menu 5), or is within a predetermined acceptable range of values for the expected case length value stored in build menu 5, the processor determines that the case is properly oriented. As explained above, cases that are not properly turned 90 degrees (i.e., not squared against pusher bar 70) present a longer length because they are measured on a diagonal—the distance measured from the leading surface 12' to the trailing surface 12" is greater across the diagonal than the distance between side edges. If the case length value as determined by the distance between the leading edge 12' at sensors 96a and 96b and pusher bar 70 is not within the predetermined expected case length value or range, indicating a miss-turned case, the processor 4 may then stop for operator intervention.

The position of pusher bar 70 as determined by encoder feedback provides a known position of the trailing edge 12" of a case 12 and transport speed. This allows the row build conveyer 100 to be in a position to properly receive the case 12 as it is delivered from the pusher bar section 18 to the row build conveyer 100. As detailed below, before a case 12 is transferred from the pusher bar section 18 onto to the row build conveyer, the row build conveyer may be operated to create a gap between adjacent cases as required according to the build menu 5. Alternately, the speed of the row build conveyer 100 may be synchronized with the pusher bar 70 speed so that adjacent cases 12 are immediately next to one another on the row build conveyer without a space between adjacent cases.

Sensors 96a and 96b define the case 12 length measurement sensors in conjunction with the pusher bar 70 position and the expected case length based on build menu 5 in processor 4. As the case leading edge 12' of a case 12 is transported past sensors 96a and 96b the controller 4 will have data corresponding to the length of the case, based on the location of pusher bar 70 and the position of the leading edge 12' of the case 12, and compares the length dimension derived from data from the sensors to the length dimension stored in the controller based on expected length from the build menu 5. The distance between the pusher bar 70 and the paired sensors 96a and 96b is a function of the encoder based positioning value of bar 70 when the sensors are broken. As such, when the leading edge 12' of the case 12 breaks the beam of light between sensors 96a and 96b the case length is determined and compared to the expected value.

If the dimension of case 12 measured by the position of pusher bar 70 and the leading edge 12' of the case as measured by sensors 96a and 96b is different from the expected dimension value stored in controller 4 based on the build menu 5, controller 4 recognizes that the case is skewed or otherwise incorrectly positioned and the controller can stop operations and/or alert the operators.

The pusher bar continues to drive a properly straightened case 12 downstream and over dead plate 53 and onto the next downstream section of the palletizer, which is the row build conveyer 100. Row build conveyer 100 also utilizes an encoder feedback motor 103 that is under the control of processor 4.

The infeed system 10 and row build conveyer 100 comprise at least three different methods to effectively position cases 12 on row build conveyer 100—that is, to position the cases properly according to the build menu 5. Each of the three methods confirms that the case 12 is properly turned on the row build conveyer—as noted above, if a case 12 is improperly turned so that it is skewed, turned when it should be straight or straight when it should be turned based on the break of the light beam between sensors 96a and 96b by leading edge 12' and pusher bar 70 position based on encoder feedback, the controller either shuts the system down so that the problem may be corrected, or otherwise signals the operators that intervention is required.

The three methods for proper induction of cases 12 onto row build conveyer 100 are as follows:
1) When the pusher bar 70 reaches the encoder value representing the count where the leading edge 12' of the case 12 should break the sensors 96a and 96b where the case begins to transition onto row build conveyer 100, row build conveyer 100 is energized and the case transitions onto the row build conveyer in a relatively synchronized manner. When the case 12 has been fully transitioned onto the row build conveyer 100, the row build conveyer stops if no gap between adjacent cases is required, or runs for a predetermined time or encoder pulse value based on the build menu 5 to create a gap in anticipation of the next following case 12;
2) The row build conveyer 100 is able transport the case 12 thereon so as to create a space that will be in preparation for receipt of the next following case 12, including any required gap by immediately after full receipt of a case 12 rapidly indexing the case length if the cases are to be adjacent to each other or case length plus a gap. In this manner the pusher bar 70 essentially pushes the case 12 onto a static surface row build conveyor 100 (i.e., over dead plate 53) and then the row build conveyor 70 is energized by controller 4 to create a gap in anticipation of the next case needs; and
3) A combination of the two above methods where the row build conveyer 100 always runs on some distance after receipt of a case 12 so that when the leading edge 12' of a case 12 is transitioning onto row build conveyor 100 the pusher bar 70 is initially pushing the case onto a static or just-starting-to-run row build conveyor 100 surface, but the row build conveyor is equal to the speed of pusher bar 70 speed and indexes the programmed amount the next case would require for proper position including a gap, if any. This method allows the row build conveyor 100 to effectively index a spaced amount as would be required by the next case, but the speed of motion of the row build conveyor 100 is not necessarily synchronized with the speed of the pusher bar 70 speed. The initial gap provides a space for the pusher bar 70 to transition the case onto row build conveyor 100, which is then absorbed as the two conveyors ultimately synchronize positions based on each other's encoder values.

It will be appreciated that the foregoing system and methods allow for the system—that is, controller 4—to accurately recognize the position of the trailing edge 12" of a case 12 as the case is transferred from the pusher bar section 18 onto the row build conveyer 100—the encoder position of the pusher bar 70 when it stops moving the case 12 toward the row build conveyer 100 thus registers the position of the trailing edge 12". This allows the row build conveyer 100 to index a programmable valued based on the requirements of the build menu 5 before the next case 12 is induced onto the row build conveyer. As noted, in some instances the build menu will call for the next case 12 to be immediately adjacent the prior downstream case so that there is no gap between the two cases 12. In other instances, the build menu will call for a gap between the cases. In the latter case where a gap is required the row build conveyer will create the gap by continuing to run a predetermined amount of encoder pulses to create the desired gap between the cases. Those of skill in the art will recognize that a timer may be used in lieu of encoder pulses to achieve the desired positioning of cases on the row build conveyer.

A brief summary of important points in the foregoing description include the following:
a) the leading edge 12' of cases 12 turned (or not turned, as the case may be) by the case turner section 16 break the beam of light between sensors 94a and 94b, thereby causing operation of a pusher bar 70 to engage the trailing edge 12" of the case 12;
b) the pusher bar 70 moves faster than the belt 40 and squares the case 12 by pushing the case over a more slowly moving, slowing, or static high friction surface defined by the belt 40 and or dead plate 53;
c) the leading edge 12' of case 12 breaks the beam of light between sensors 96a and 96b and the controller compares the dimension of the case by comparing the distance between the leading edge 12' and the trailing edge 12"—the later by the position of pusher bar 70 via encoder feedback motor 80—and the controller affirms that the case is in the correct position relative to expectation based on encoder values programmed into the build menu. If the measured dimension is different from the expected dimension, the system stops or otherwise signals that intervention is required;
d) when the leading edge 12' passes between sensors 96a and 96b the pusher bar section 18 initiates transition of the case 12 onto the row build conveyer according to one of the three methods described above to insure that the case is properly positioned on the row build conveyer according to build menu 5 requirements.

Figure 15:
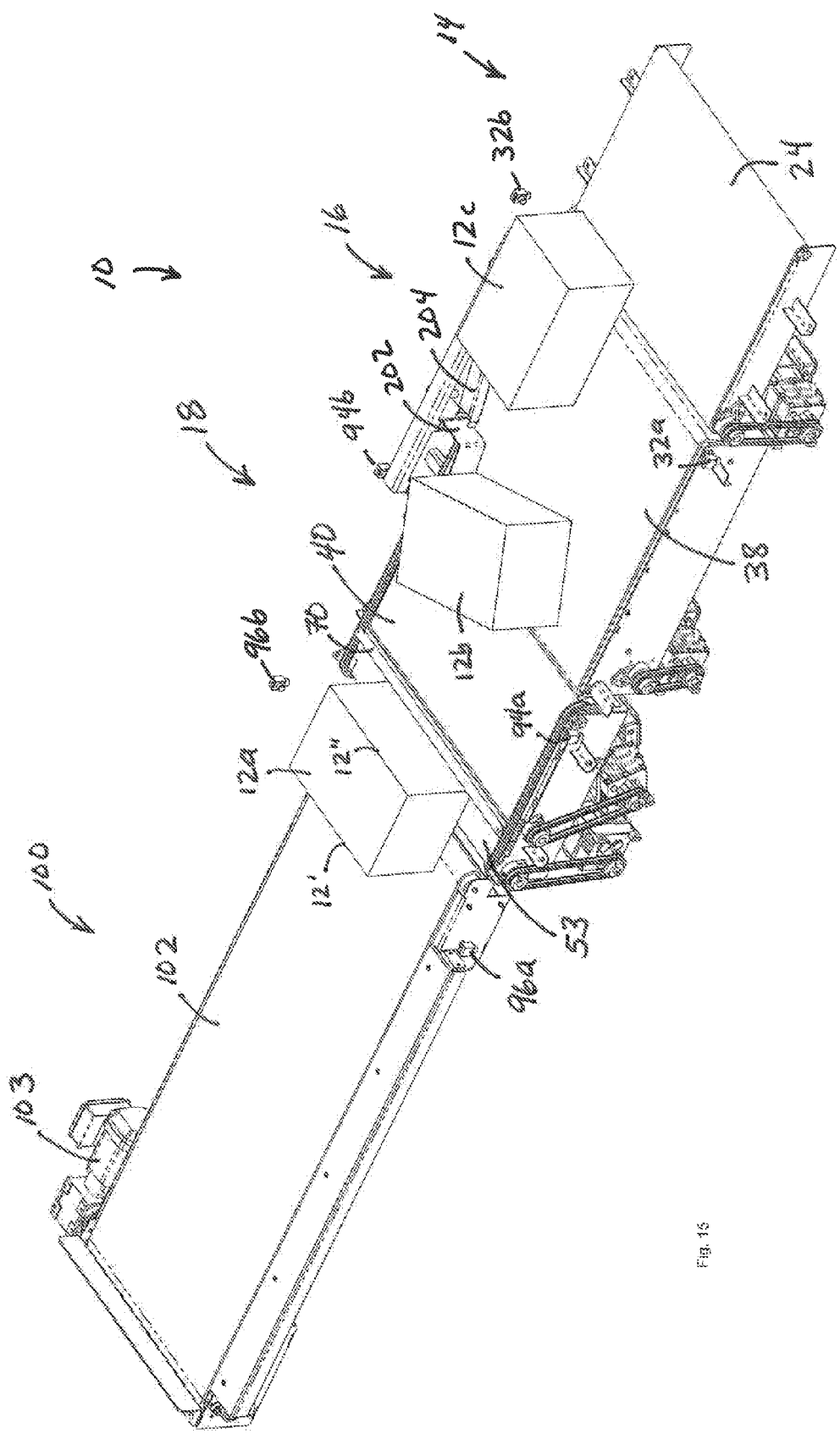
Figure 16:
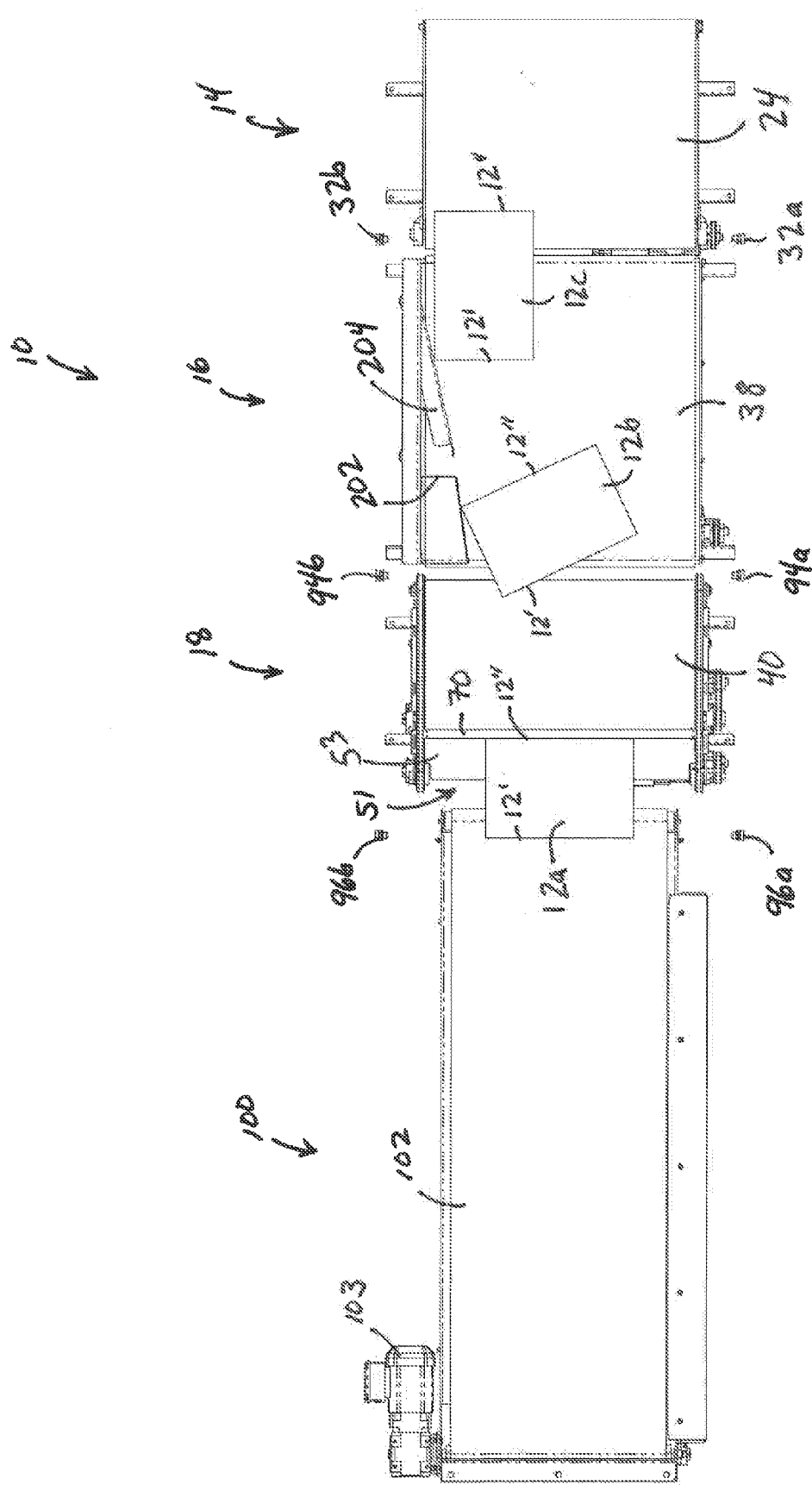

The foregoing description of the operation of infeed system 10 may be illustrated with the series of drawings of FIGS. 11 through 24, which illustrate a variety of different case numbers on the infeed system 10. As noted above, the case turner 16 shown in FIGS. 11 through 24 is a bump turn type of turner 200. Case turner 200 is a conventional turning device that includes an obstruction 202 that extends partially across the path of cases 12 being transported along the case turner section 16, and a deflector arm 204 that is operably under the control of controller 4. Operation of this type of turning device will be familiar to those of skill in the art and may be derived by comparing FIGS. 15 and 16. In FIG. 15, the deflector arm 204 is in its home or non-deployed position. In this position, case 12a strikes obstruction 202 as the case is moved from upstream toward downstream, thus causing case 12a to rotate in the clockwise direction. In FIG. 16 the deflector arm 204 is deployed outwardly from its home position. As case 12b is transported along the infeed system 10 with the deflector arm 204 deployed, the case is shifted laterally toward the center of the belt as it slides along the deflector arm, but the case is not rotated on the belt.

Figure 11:
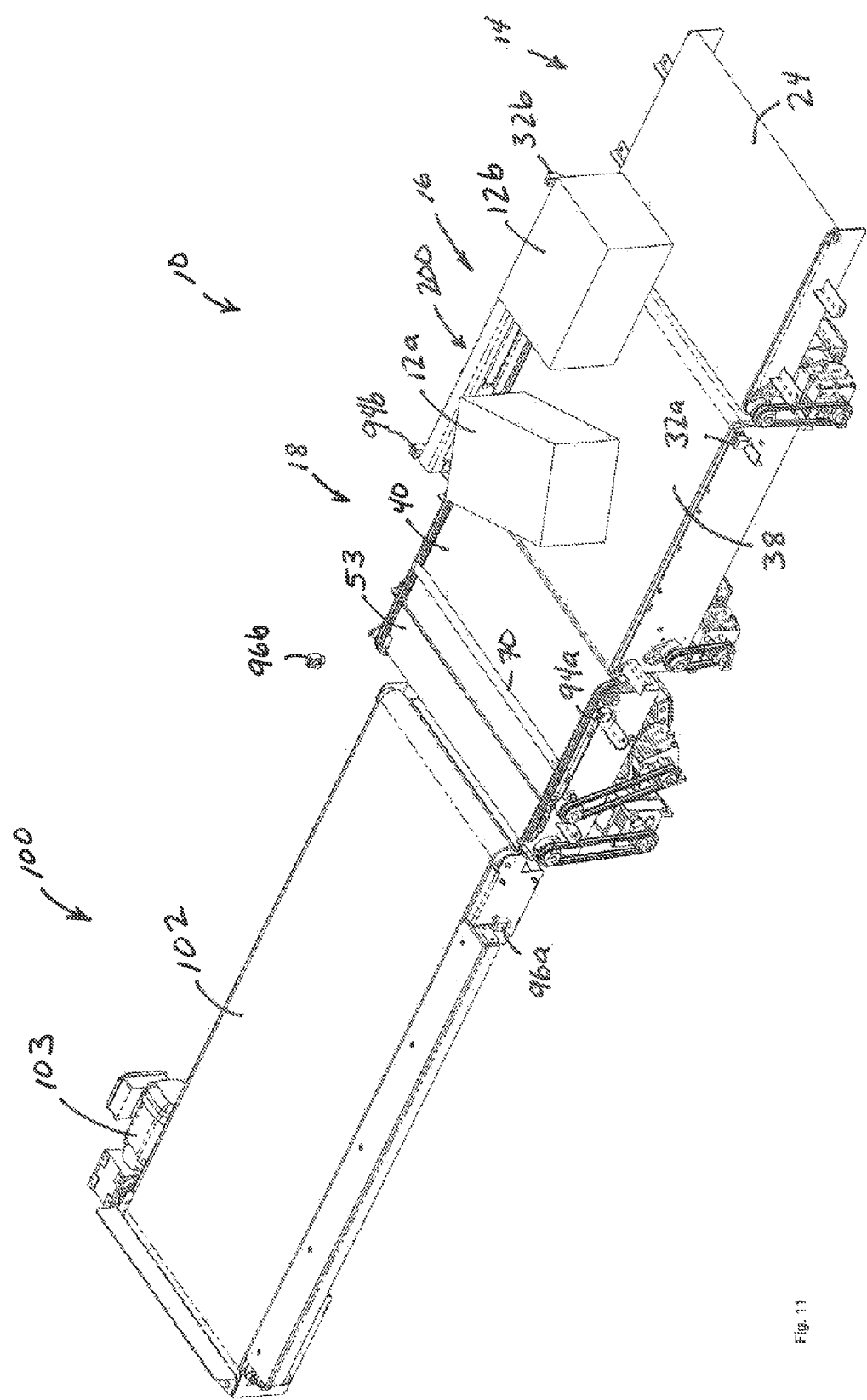
Figure 12:
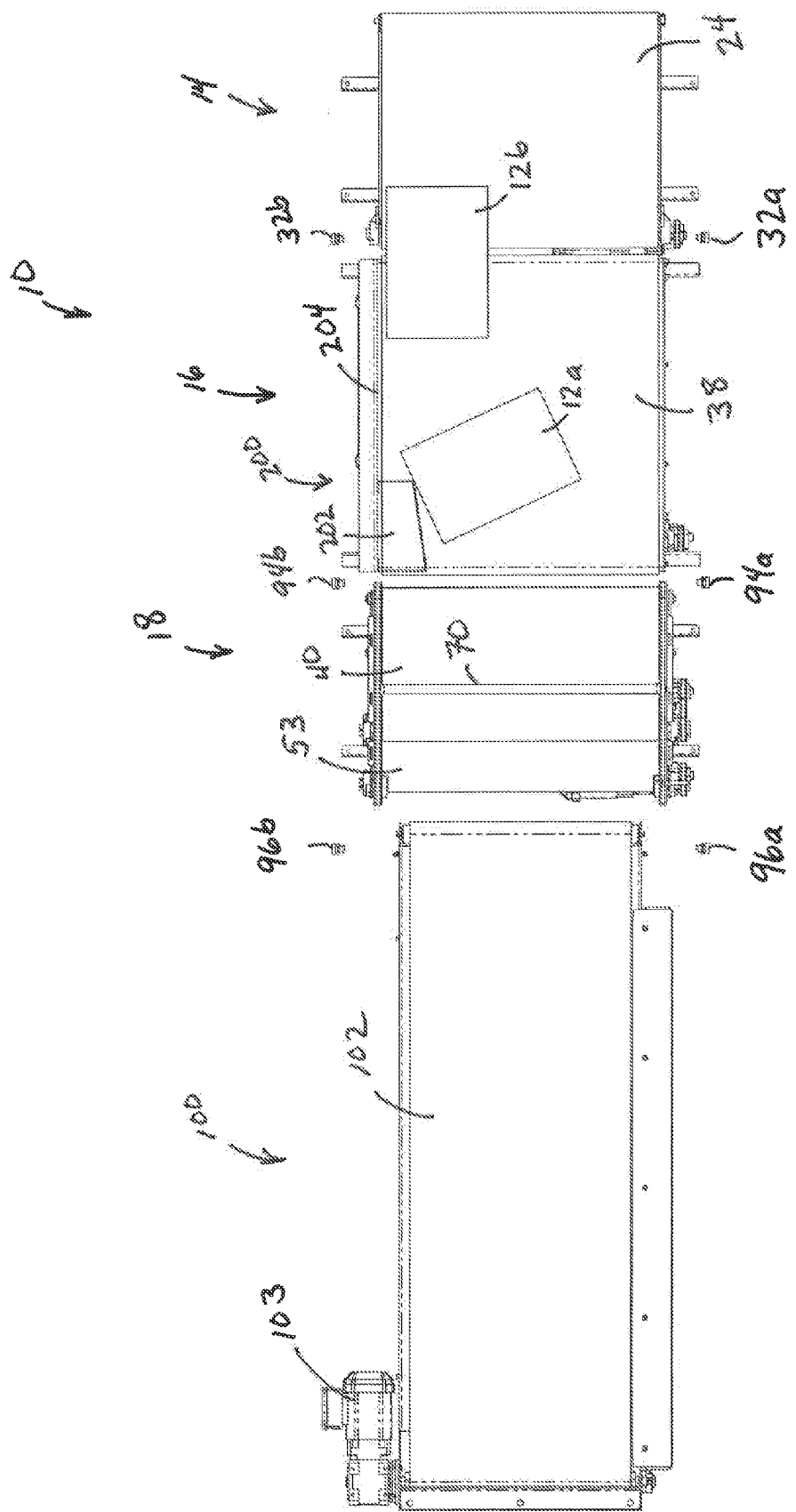
Figure 13:
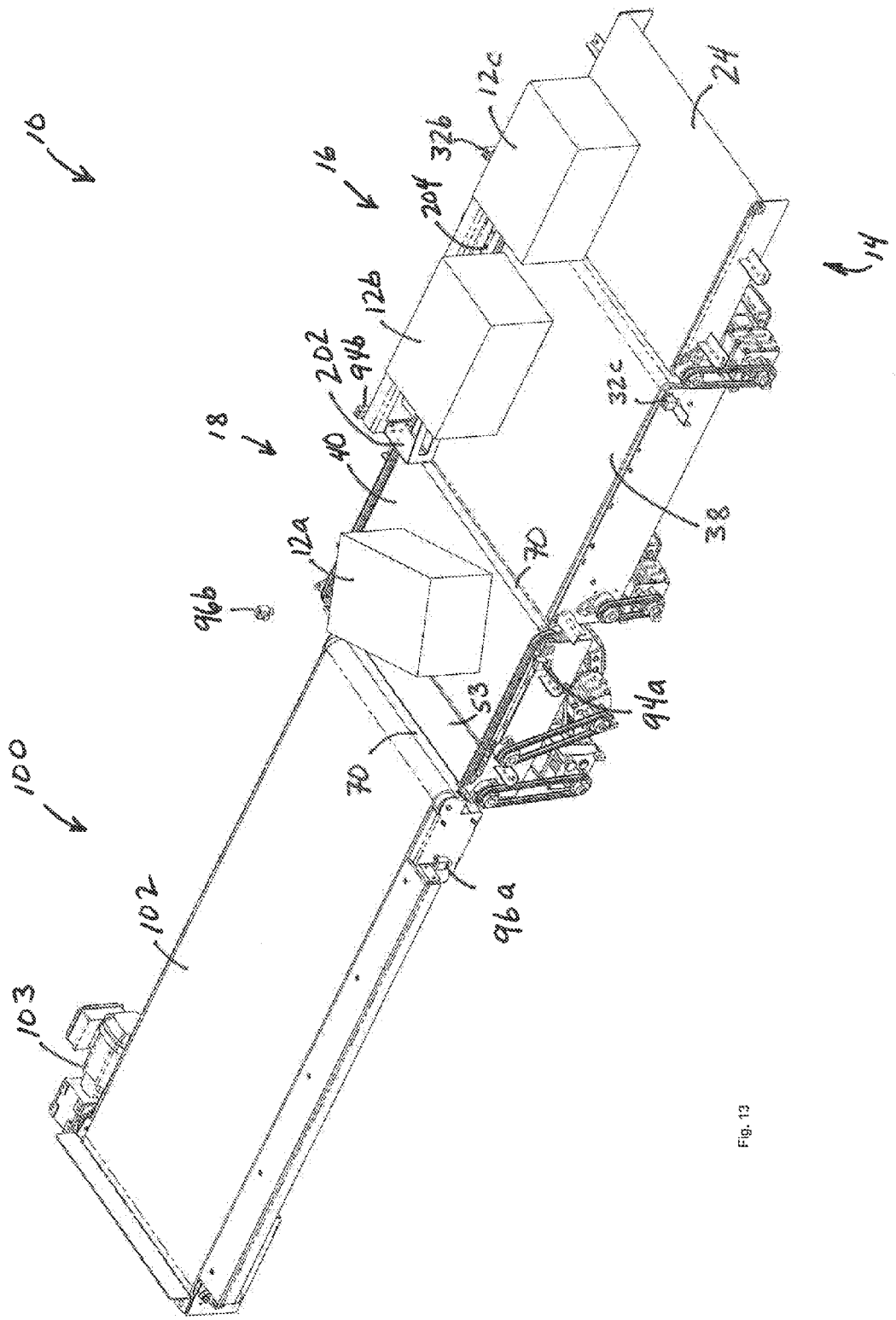

With reference now to the series of FIGS. 11 through 24, the operation and synchronization of infeed system 10 and row build conveyer 100 will be detailed by the sequential nature of the drawings. The drawings of FIGS. 11 through 24 are paired and show sequential steps involved in operation of the infeed system and row build conveyer. Thus, FIG. 11 is a perspective view and FIG. 12 is a top plan view of FIG. 11 and is the first in the series of steps; FIG. 13 is a perspective view and FIG. 14 is a top plan view of FIG. 13 and these drawings represent the following step in the sequence, and so on.

FIGS. 11 and 12 show two cases on infeed system 10. Case 12b is being handed off from the metering belt section 14 to the case turner section 16 and case 12a is being turned by the bump turner 200, and more specifically, by bumping into the obstruction 202 that is in the path of the case (i.e., the deflector arm 204 is in its home, non-deployed position).

Figure 14:
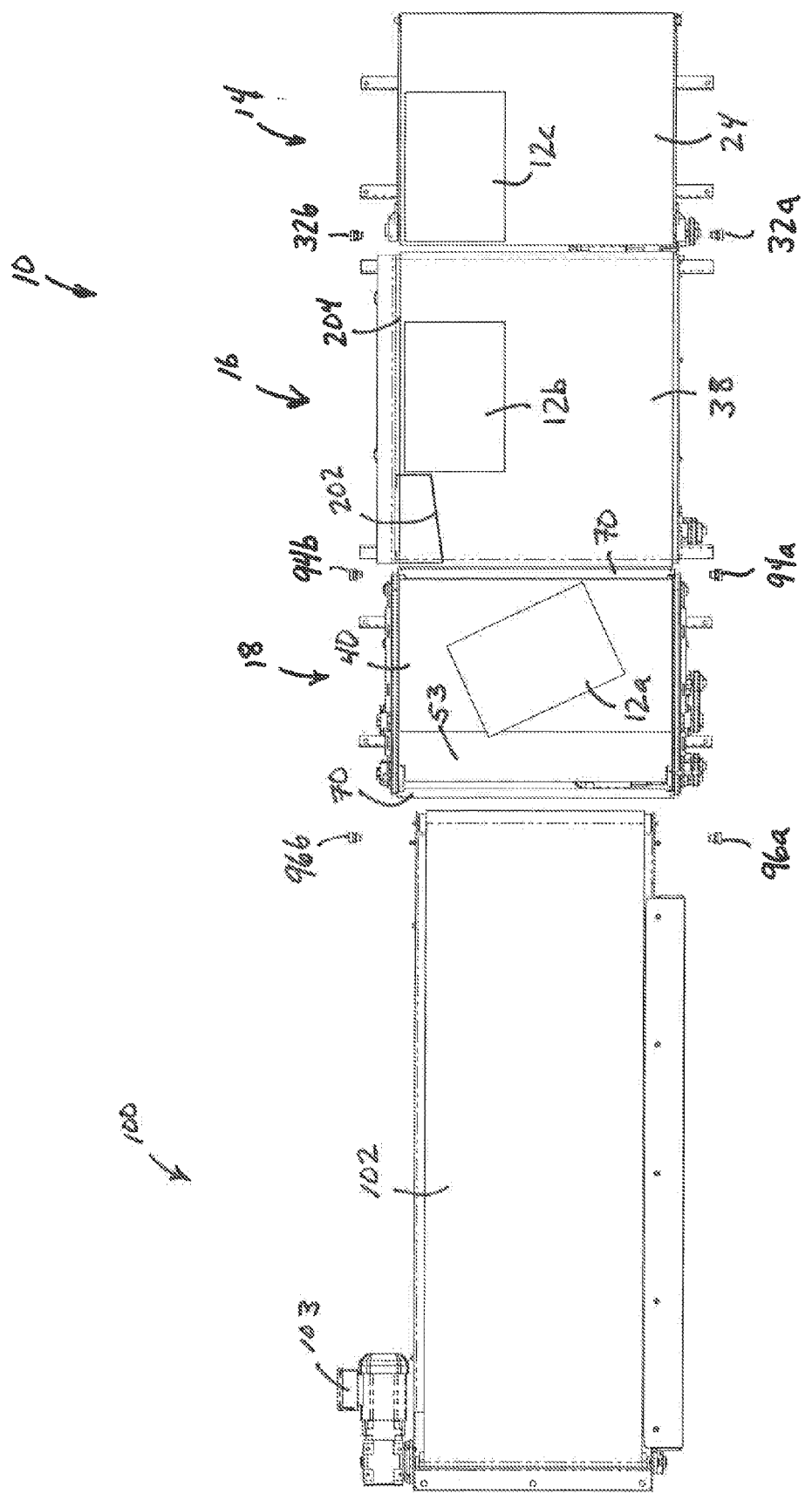

In FIGS. 13 and 14 another case 12c has been added onto the metering belt section 14 and the most downstream case 12a of the three cases has been partially turned by the bump turner 200 and fully transported onto the pusher bar section 18 in a slightly skewed position. In other words, the trailing edge 12" of case 12a is not parallel to the pusher bar 70, which may be seen approaching the trailing edge 12". As noted above, when the trailing edge 12" passes sensors 94a and 94b, processor 4 recognizes that a case 12 is fully on the pusher bar section 18 and thus activates movement of the pusher bars 70 and concurrent slowing (or stopping) of belt 40.

FIGS. 15 and 16 is the next sequential view of the cases shown in FIGS. 13 and 14. In FIGS. 15 and 16 case 12c has been engaged by pusher bar 70 and has been squared against the pusher bar. Accordingly, case 12c is properly oriented. In these figures, the leading edge 12' of case 12a is just passing sensors 96a and 96b. As such, processor 4 is at this time evaluating the orientation of case 12a (by the value representing the distance between the leading edge 12' and the position of pusher bar 70 at the trailing edge 12"). Because the case 12a is squared against the pusher bar, the length value will be consistent with the expected value (unless the case 12a, which is rectangular, were actually turned 90 degrees from what was expected according to the build menu 5, in which case the measured value would be different from the expected value). It will be understood that depending on the orientation of a case 12, the "leading edge" 12' may be defined by either a side of a case (where, for instance, the case is squared properly on the belt) or a corner of the case (where, for instance, the case is skewed). The same applies to the trailing edge. As such, the terms "leading surface" and "trailing surface" are sometimes used to describe the portion of a case that is "leading" or "trailing."

Also illustrated in these figures is case 12b being turned by obstruction 202 of bump turner 200, and deflector arm 204 moved into its deployed position so that case 12a will not bump into obstruction 202 and will therefore not be turned.

Figure 17:
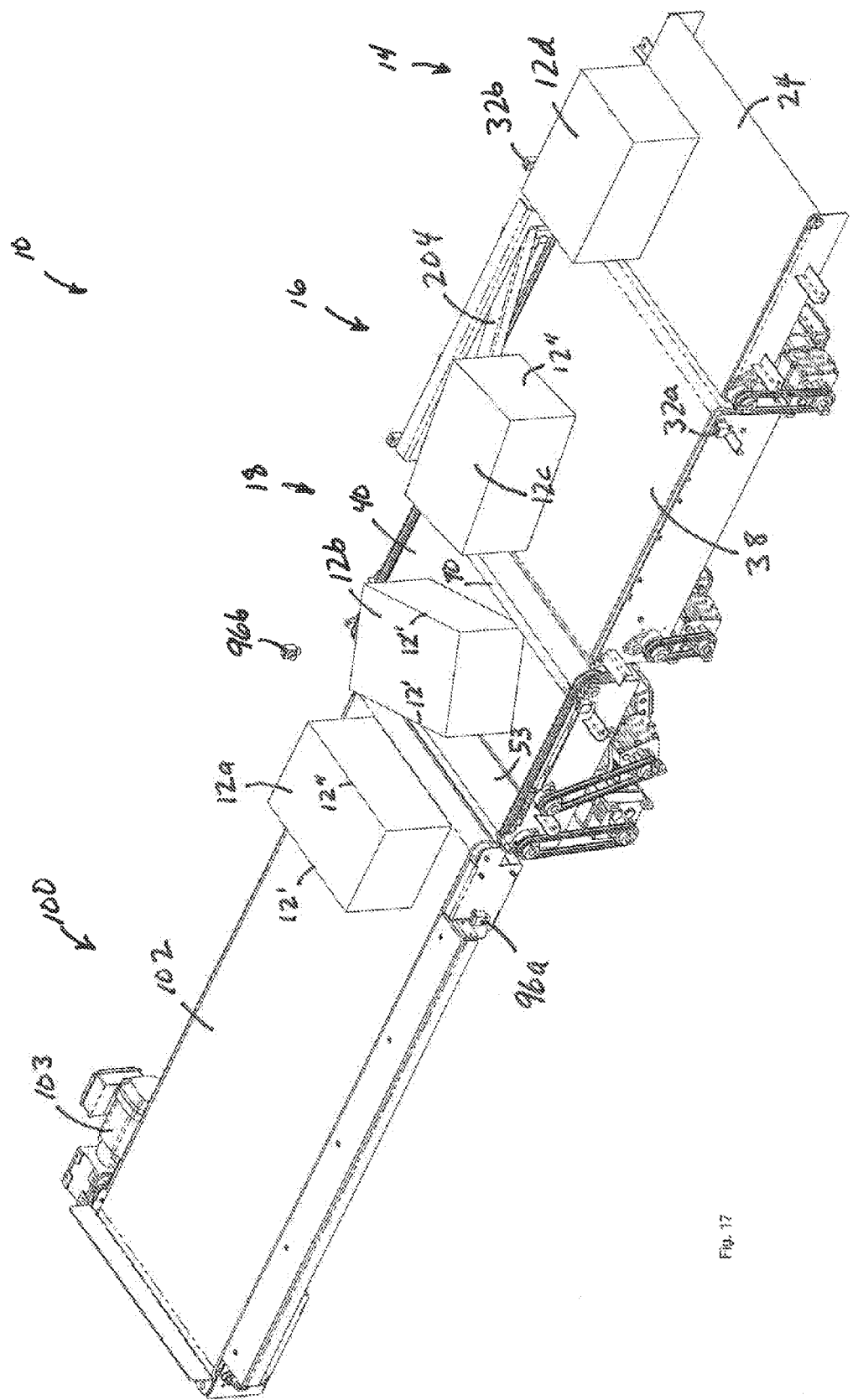
Figure 18:
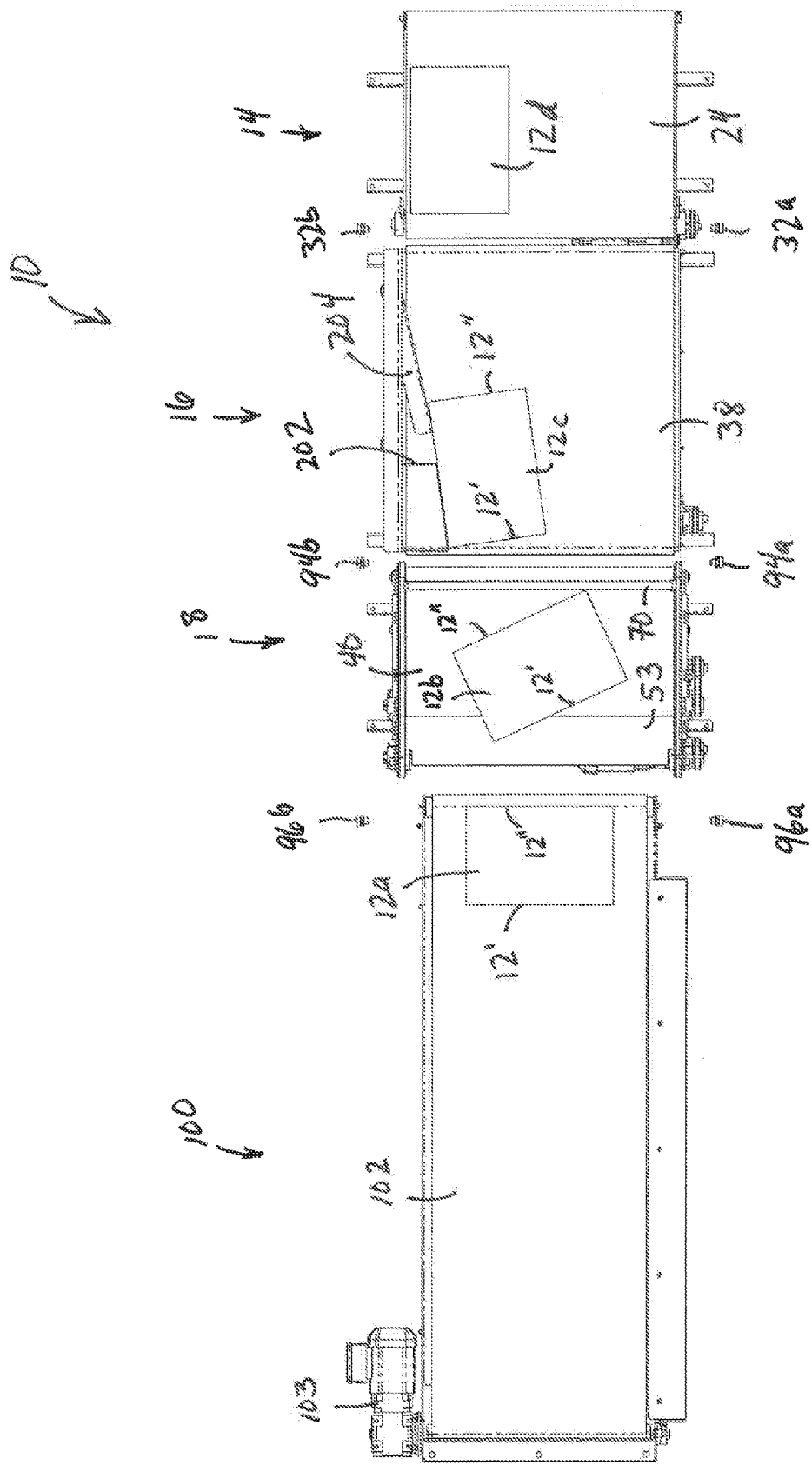

Moving to FIGS. 17 and 18, case 12a is fully supported on row build conveyer 100, which has been stopped by processor 4 as case 12b is being squared on the pusher bar section 18 by pusher bar 70 and pushed by the pusher bar over the slowed or stationary belt 40 and dead plate 53. The next immediately upstream case 12c is being shifted laterally by deflector arm 204, but not turned, and case 12d is ready for transfer from metering section 14 onto case turner section 16.

Figure 19:
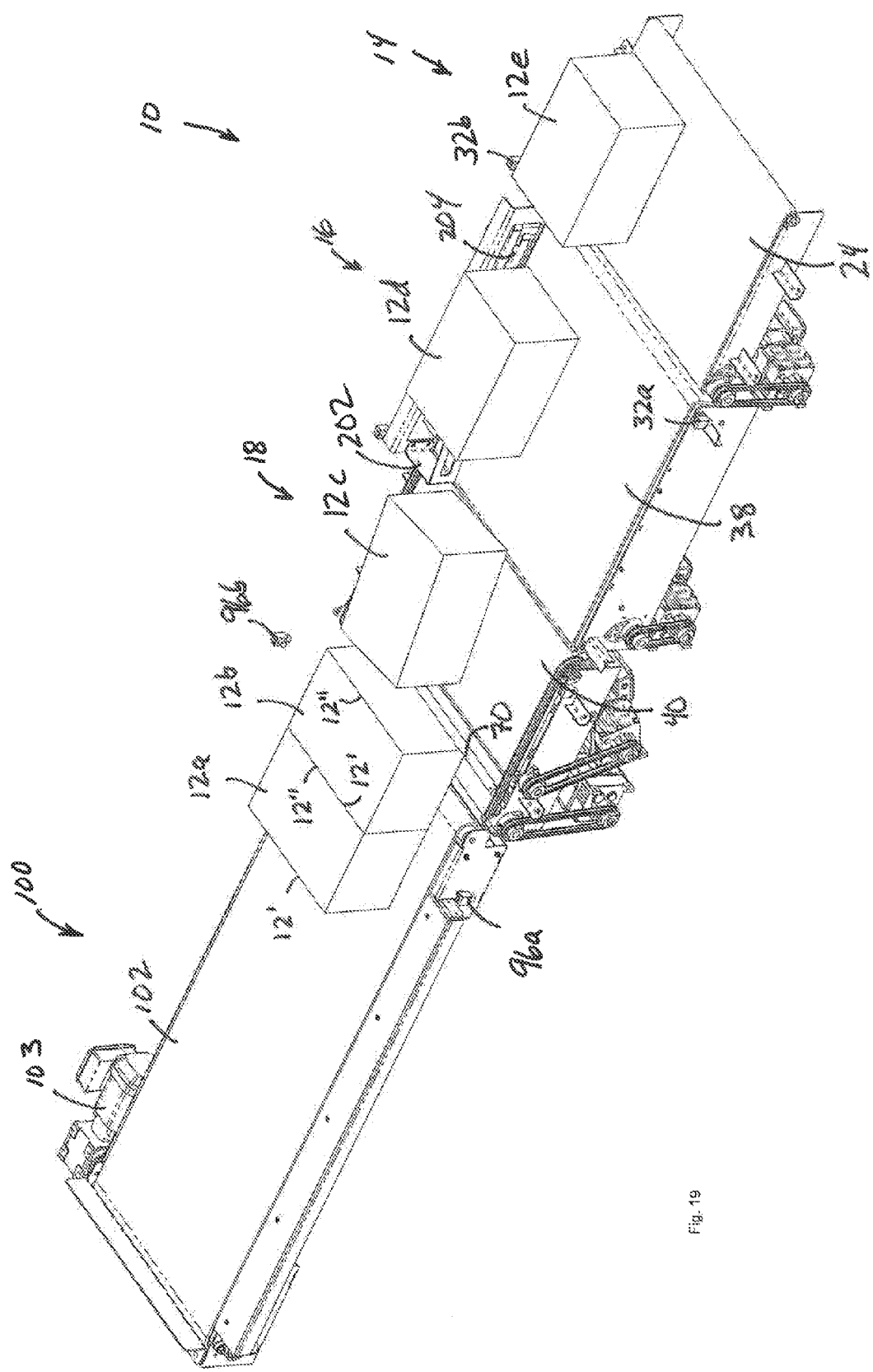
Figure 20:
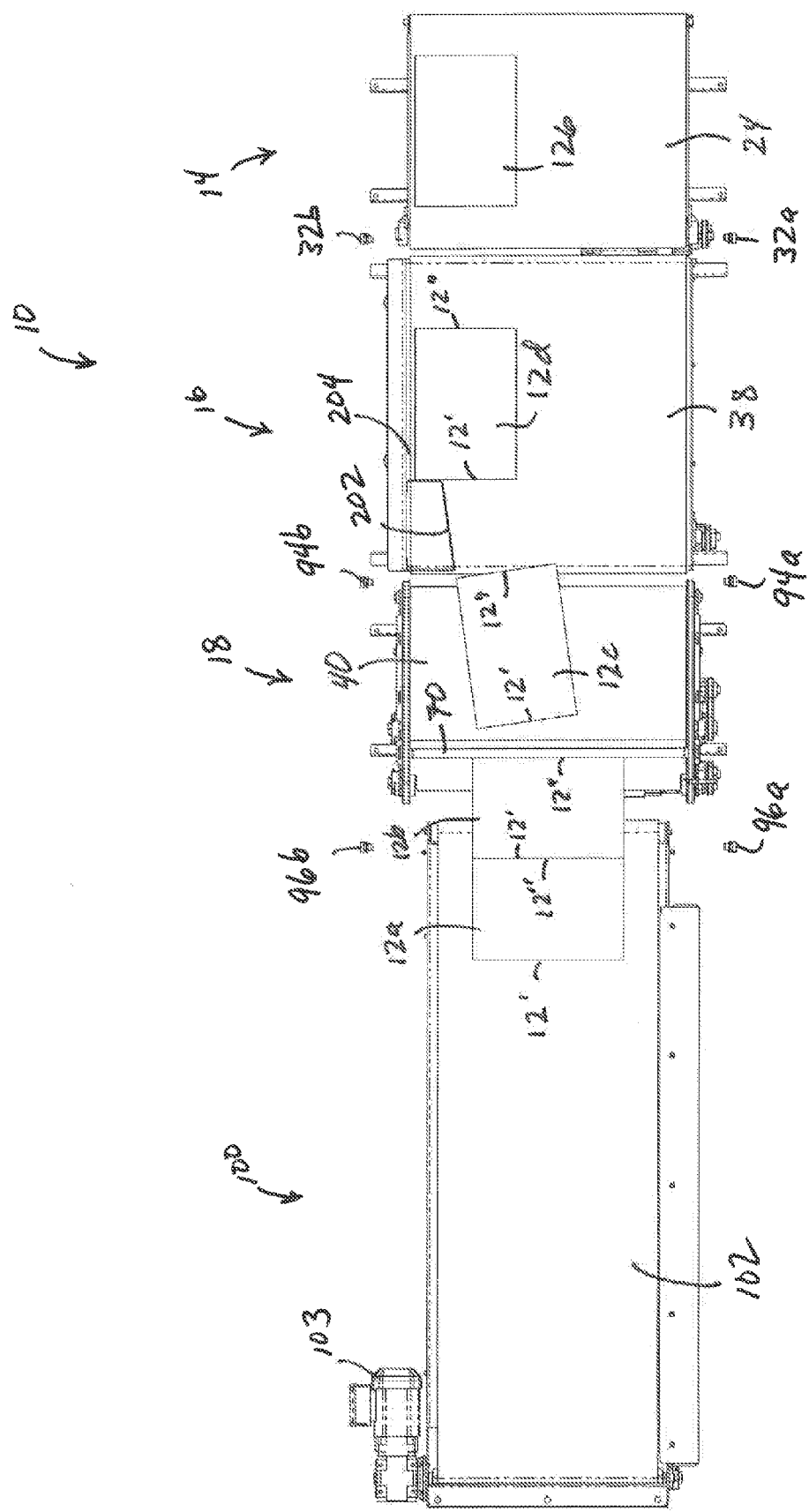

FIGS. 19 and 20 show the next sequential step and illustrate the operation of row build conveyer 100 according to the specific build menu 5. Here, the build menu has called for cases 12a and 12b to be immediately next to one another in the row that is being built on the row build conveyer, without a gap between the two cases. The row build conveyer is thus not operated in the time between the FIGS. 17 and 18, and the time shown in FIGS. 19 and 20. As case 12b is pushed by pusher bar 70 onto row build conveyer 100, the conveyer is stationary so that case 12a is moved by case 12b being pushed against it. Case 12c is nearly but not fully on pusher bar section 18—the trailing edge 12" has not passed sensors 94a and 94b so the pusher bars 70 are not yet activated, and case 12d is about to be turned by bumping into obstruction 202. A case 12e has been added to metering section 14.

Figure 21:
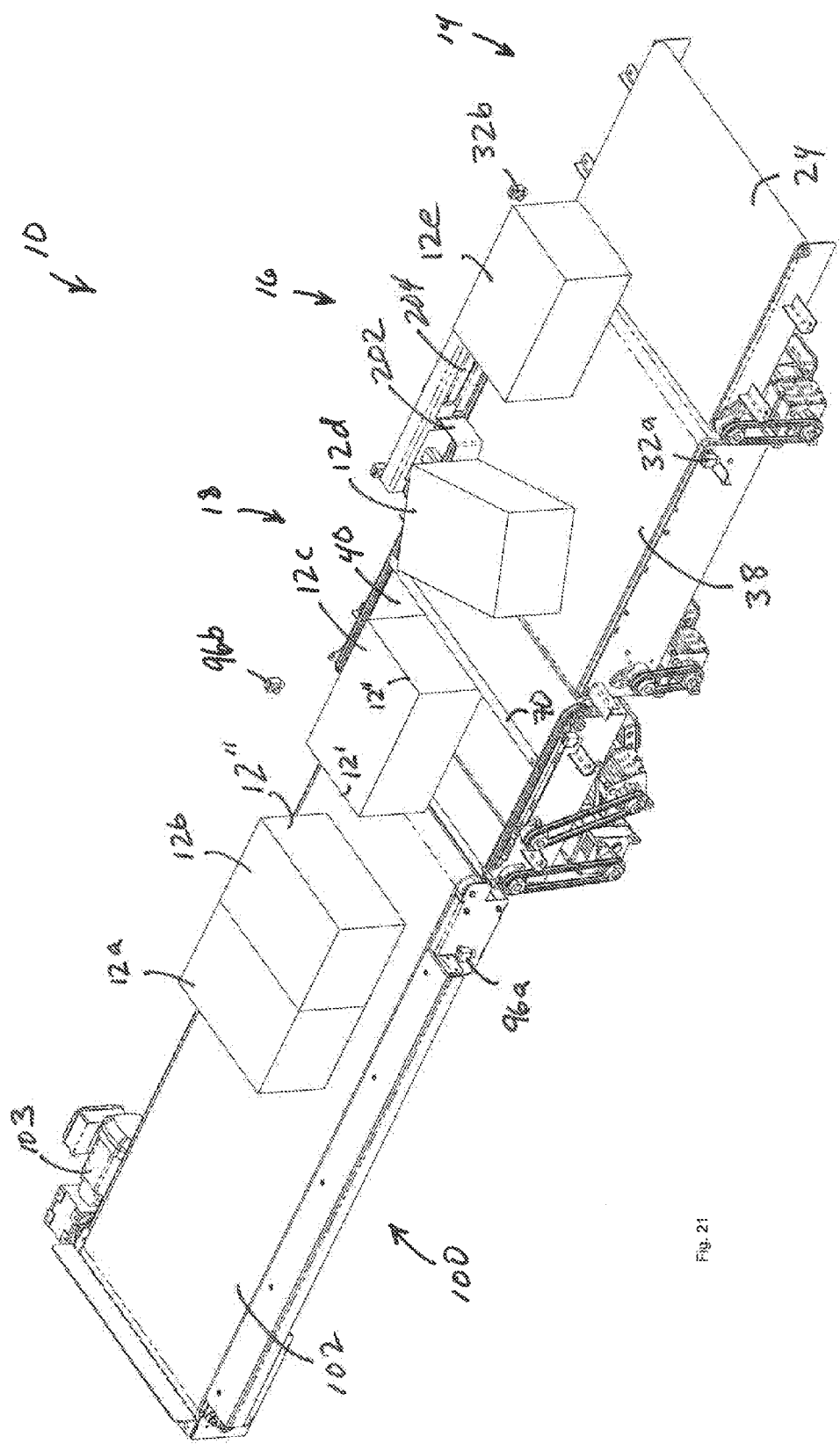
Figure 22:
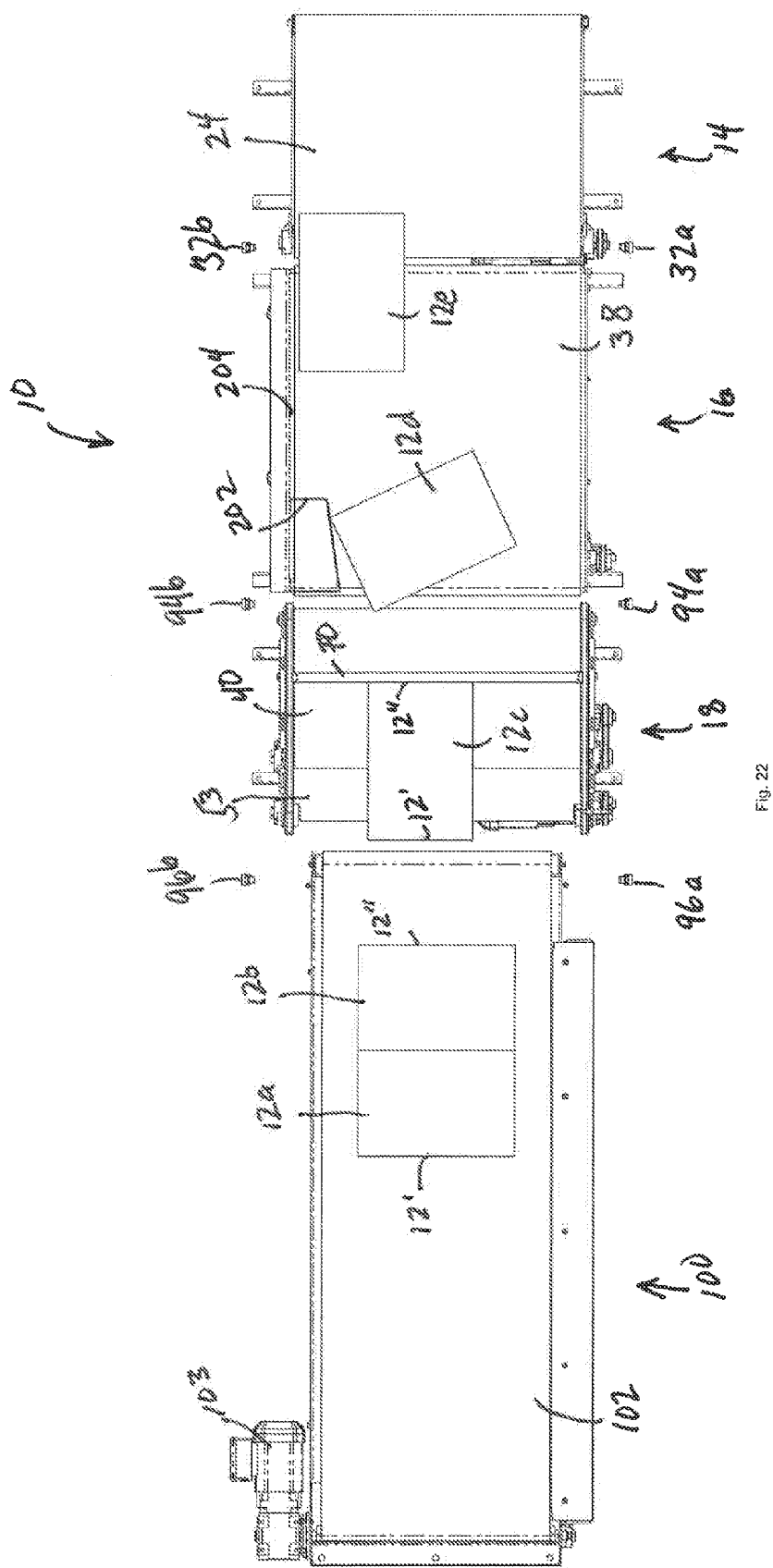

In FIGS. 21 and 22 the row build conveyer 100 has been operated to transport cases 12a and 12b in the downstream direction to create a gap between case 12b and the following case 12c, which is being pushed onto the row build conveyer 100 by pusher bar 70, and a gap between case 12c and the following case 12d. Case 12e is being turned by obstruction 202 and case 12e is being transported onto the case turner section 16 from the metering belt section 14.

Figure 23:
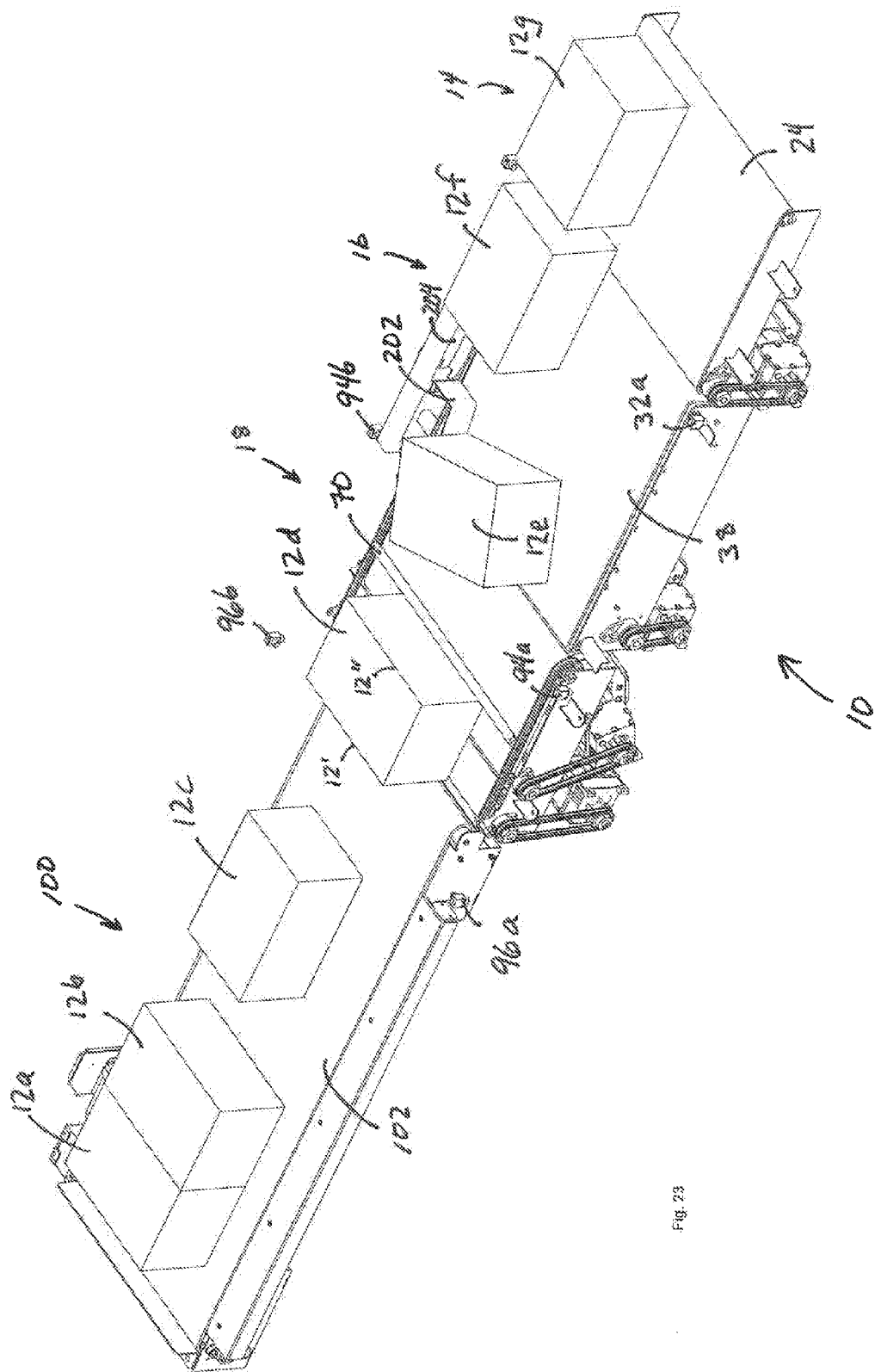

FIGS. 23 and 24 are the last in the series of sequential illustrations. In these figures, two new cases (12f and 12g) have been placed on the case turner section 16 and the metering belt section 14, respectively. Case 12e is being turned on the case turner section 16.

The sequential operation of the infeed system 10 with row build conveyer 100 thus allows for building of a row on the row build conveyer with cases 12 in the desired orientation and with adjacent cases either immediately adjacent one another, or with desired gaps, all determined by the build menu 5.

It will be appreciated by those of skill in the art that certain equivalent modifications may be made to the structures described herein without changing the nature or scope of the invention. For instance, the pusher bars 70 shown and described herein travel along a path that roughly follows the path of the conveyer belt 40—the pusher bars cycle beneath the belt as they rotate. However, the pusher bars could just as well descend from above the belt to engage cases on the conveyer. And while the illustrated embodiments described above are discussed in terms of manipulating standard boxes, the inventions described herein may be used to manipulate any number of other items including, for example, bags, bundles, trays and the like that may be palletized.

While the present invention has been described in terms of preferred and illustrated embodiments, it will be appreciated by those of ordinary skill that the spirit and scope of the invention is not limited to those embodiments, but extend to the various modifications and equivalents as defined in the appended claims.

The invention claimed is:
1. Infeed apparatus for a palletizer, comprising:
a first transport conveyor;
a drive connected to the first transport conveyor to move the first transport conveyor at a first speed, at least a portion of the first transport conveyor path defining an item supporting zone for supporting an item thereon, and an item supported on the first transport conveyor in the item supporting zone, said item having a leading surface and a trailing surface;

a pusher bar extending across the first transport conveyor in at least a portion of the item supporting zone;

a drive connected to the pusher bar to move the pusher bar and a position detector configured for detecting a position of the pusher bar;

a first sensor for detecting the leading surface of said item and wherein the detected position of the pusher bar defines a trailing surface position of said item.

2. The infeed apparatus according to claim 1 wherein the first transport conveyor may be moved independent of movement of the pusher bar and both the first transport conveyor and the pusher bar may be stopped and started independently.

3. The infeed apparatus according to claim 2 wherein said item defines a generally rectangular shaped member having opposed parallel sides.

4. The infeed apparatus according to claim 3 wherein the pusher bar engages the item along the trailing surface at the second speed and causes a side of said item to align with said pusher bar.

5. The infeed apparatus according to claim 4 wherein the pusher bar advances the item over first transport conveyor independently of movement of the first transport conveyor.

6. The infeed apparatus according to claim 5 including a dead plate downstream of said first transport conveyor, wherein said pusher bar advances said item over said dead plate at said second speed.

7. The infeed apparatus according to claim 3 including a controller interfaced with the first sensor and the position detector, wherein said controller is configured for determining a detected item length value from the detected leading surface and the trailing surface position as defined by the detected position of the pusher bar.

8. The infeed apparatus according to claim 7 wherein said controller compares said detected item length value to an expected item length value and if the detected item length value is not within a predetermined range of expected item length values said controller stops operation of said infeed apparatus.

9. The infeed apparatus according to claim 8 in which said detected item length value is within the range of predetermined expected item length values when the item trailing surface is defined by a side of said item and said side is aligned with said pusher bar.

10. The infeed apparatus according to claim 9 wherein the position detector further comprises the drive connected to the pusher bar.

11. The infeed apparatus according to claim 7 in combination with a row build conveyor positioned to receive said item from said infeed apparatus, said row build conveyor having a row build drive connected to a row build transport conveyor for moving said row build transport conveyor in the first direction.

12. The infeed apparatus according to claim 11 wherein said controller is operable to operate said row build drive to position said item on said row build transport conveyor in a predetermined position relative to another item on said row build transport conveyor.

13. Infeed apparatus for a palletizer, comprising:
a first conveyor movable at a first speed and in a first direction, the first conveyor defining an item supporting zone for supporting an item thereon;
a pusher for pushing the item on the item supporting zone in the first direction so that a trailing surface of said item aligns with said pusher and an encoder for detecting the location of the trailing surface; and
a first sensor for detecting a leading surface of said item.

14. The infeed apparatus according to claim 13 including item length measuring means for determining the length of the item between the leading surface and the trailing surface to thereby establish a measured item length.

15. The infeed apparatus according to claim 14 including length comparing means for comparing the measured item length to an expected item length, and including means for stopping the first conveyor and the pusher if the measured item length is outside a predetermined range of the expected item length.

16. The infeed apparatus according to claim 13 in combination with a row build conveyor for receiving plural items from said pusher, said row build conveyor including variable positioning means for locating said plural items in predetermined positions relative to one another on said row build conveyor.

17. The infeed apparatus according to claim 16 wherein said variable positioning means includes gapping means for located adjacent items on said row build conveyor with a space there between.

18. Infeed apparatus for a palletizer, comprising:
an item straightener defined by an item supporting conveyor moving at a first speed and an item advancing member for advancing an item on said item supporting conveyor at a second speed that is greater than the first speed; and
a first sensor for detecting a leading surface of said item and a detector for determining the position of the item advancing member so that the item advancing member defines a trailing surface position of said item.

19. The infeed apparatus according to claim 18 wherein the second speed is greater than the first speed.

20. The infeed apparatus according to claim 19 wherein the item advancing member pushes the item on the item supporting conveyor at the second speed while the item supporting conveyor is moving at the first speed.

21. The infeed apparatus according to claim 20 including a controller for determining a detected item length based on the leading surface as detected by the first sensor and the trailing surface position as detected by the item advancing member, and for comparing the detected item length to a predetermined expected item length range, wherein if the detected item length range is different from the predetermined expected item length range the controller signals an out of bounds condition.

22. Infeed apparatus for a palletizer, comprising:
an item supporting member adapted for transporting an item in a first direction and at a first speed;
a pusher for advancing the item on the item supporting member independently of the item supporting member so that said item moves on the item supporting member in the first direction and at a second speed that is different from the first speed;
an item length measuring means for determining a detected item length of said item, including a sensor for detecting a leading surface of said item and the item length is defined by the distance between the detected leading surface and the pusher.

23. The infeed apparatus according to claim 22 in which the item supporting member moves in a first direction at a first speed and the pusher pushes an item on the item supporting member at a second speed that is greater than the first speed.

* * * * *